US008007907B2

(12) United States Patent
Nakamura

(10) Patent No.: US 8,007,907 B2
(45) Date of Patent: Aug. 30, 2011

(54) GLASS-CONTAINING MOLDING COMPOSITION AND PROCESS FOR PRODUCTION OF THE SAME

(76) Inventor: Kenji Nakamura, Osaka (JP)

( * ) Notice: Subject to any disclaimer, the term of this patent is extended or adjusted under 35 U.S.C. 154(b) by 0 days.

(21) Appl. No.: 12/681,594

(22) PCT Filed: Oct. 3, 2008

(86) PCT No.: PCT/JP2008/068093
§ 371 (c)(1),
(2), (4) Date: Aug. 3, 2010

(87) PCT Pub. No.: WO2009/044884
PCT Pub. Date: Apr. 9, 2009

(65) Prior Publication Data
US 2010/0292067 A1  Nov. 18, 2010

(30) Foreign Application Priority Data

Oct. 4, 2007  (JP) ................................ 2007-260443
Jul. 7, 2008  (JP) ................................ 2008-176589

(51) Int. Cl.
*B32B 5/16* (2006.01)
*B05D 3/02* (2006.01)
*B05D 7/00* (2006.01)

(52) U.S. Cl. ........ 428/403; 427/189; 427/190; 427/195; 427/226; 427/228; 428/406; 428/407

(58) Field of Classification Search .......... 428/402–407; 427/189, 190, 195, 221, 226, 228
See application file for complete search history.

(56) References Cited

U.S. PATENT DOCUMENTS

| 2,800,457 | A | * | 7/1957 | Green et al. ............... 428/402.2 |
| 3,237,596 | A | * | 3/1966 | Grass, Jr. et al. ............... 118/62 |
| 3,992,558 | A | * | 11/1976 | Smith-Johannsen et al. . 427/213 |
| 4,713,295 | A | * | 12/1987 | Laroche ....................... 428/406 |

(Continued)

FOREIGN PATENT DOCUMENTS

| JP | 5-70624 | 3/1993 |
| JP | 5-287177 | 11/1993 |
| JP | 8-291257 | 11/1996 |
| JP | 10-45989 | 2/1998 |

(Continued)

OTHER PUBLICATIONS

Haruo Sasaki,"Hoso Gijutsu Binran (Handbook of Packing Technology)", NHK, Jul. 1, 1995 with a patial English translation.

*Primary Examiner* — H. (Holly) T Le
(74) *Attorney, Agent, or Firm* — Knobbe Martens Olson & Bear LLP

(57) ABSTRACT

A glass-containing molding composition is prepared by incorporating glass powder into a thermoplastic resin at a glass load ratio of 40 to 70 percent by weight, in which the glass powder is composed of solid spherical glass particles which have an average particle size of 10 to 40 μm and whose surfaces are totally covered with a silane compound and which exhibits reduction ratios of melt flow rate on a parabolic curve with the increase of glass load ratios and has a reduction ratio of melt flow rate of 3/4 to 1/4 within a glass load ratio in a range of 40 to 64 percent by weight.

9 Claims, 10 Drawing Sheets

U.S. PATENT DOCUMENTS

| | | | |
|---|---|---|---|
| 4,737,407 A * | 4/1988 | Wycech | 428/323 |
| 4,764,424 A * | 8/1988 | Ganga et al. | 428/327 |
| 5,219,919 A * | 6/1993 | Ando et al. | 524/569 |
| 5,534,584 A | 7/1996 | Kitamura et al. | |
| 5,840,798 A * | 11/1998 | Vollenberg et al. | 524/423 |
| 5,886,080 A | 3/1999 | Mori | |
| 6,762,219 B2 * | 7/2004 | Greiner et al. | 523/223 |
| 7,019,062 B2 * | 3/2006 | van Beek et al. | 524/425 |
| 7,037,865 B1 * | 5/2006 | Kimberly | 442/181 |
| 7,405,000 B2 * | 7/2008 | Takikawa et al. | 428/403 |
| 7,498,283 B2 * | 3/2009 | Nakagawa et al. | 501/47 |
| 7,514,144 B2 * | 4/2009 | Umetsu et al. | 428/402 |
| 7,845,409 B2 * | 12/2010 | Shinbach et al. | 166/280.2 |
| 2005/0154087 A1 | 7/2005 | Kobayashi | |
| 2006/0025513 A1 | 2/2006 | Nakagawa et al. | |
| 2007/0112123 A1 | 5/2007 | Sekine | |

FOREIGN PATENT DOCUMENTS

| | | |
|---|---|---|
| JP | 10-52870 | 2/1998 |
| JP | 10-139928 | 5/1998 |
| JP | 10-264961 | 10/1998 |
| JP | 2001-139832 A | 5/2001 |
| JP | 2002-356620 A | 12/2002 |
| JP | 2005-179631 A | 7/2005 |
| JP | 2006-22236 A | 1/2006 |
| JP | 2006-62945 A | 3/2006 |
| JP | 2007-51019 A | 3/2007 |
| JP | 2007-153729 A | 6/2007 |
| JP | 2010-235705 | * 10/2010 |

* cited by examiner

[Figure 1]
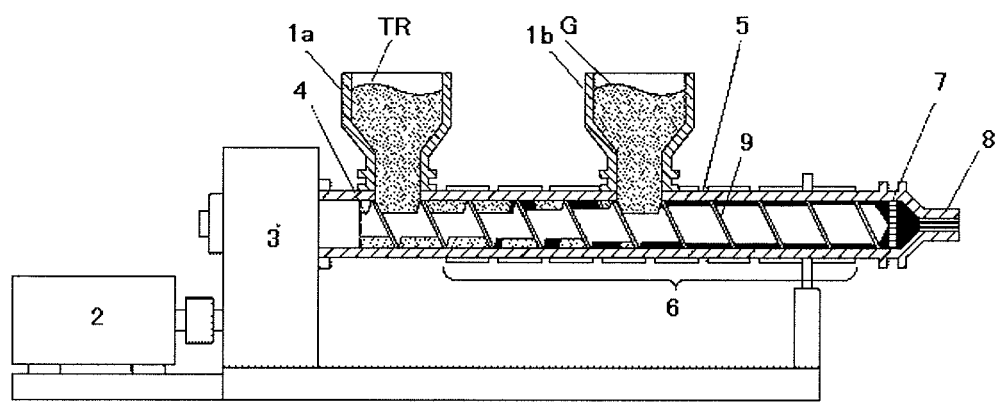
[Figure 2]
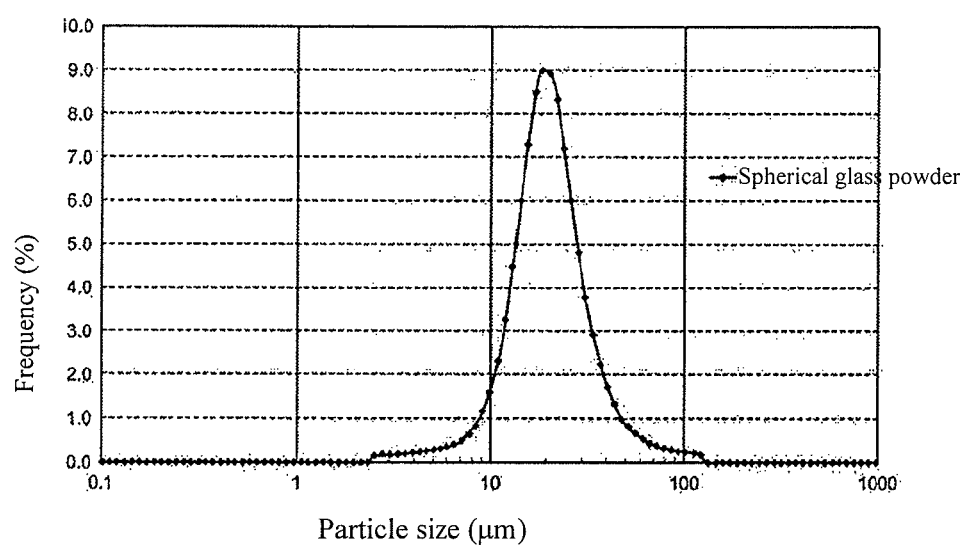

[Figure 3]
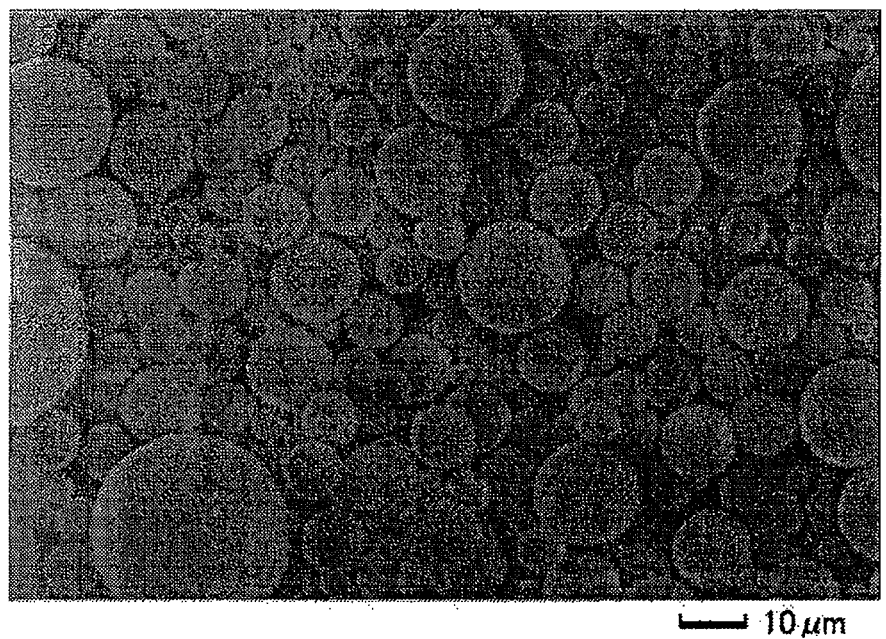
[Figure 4A]
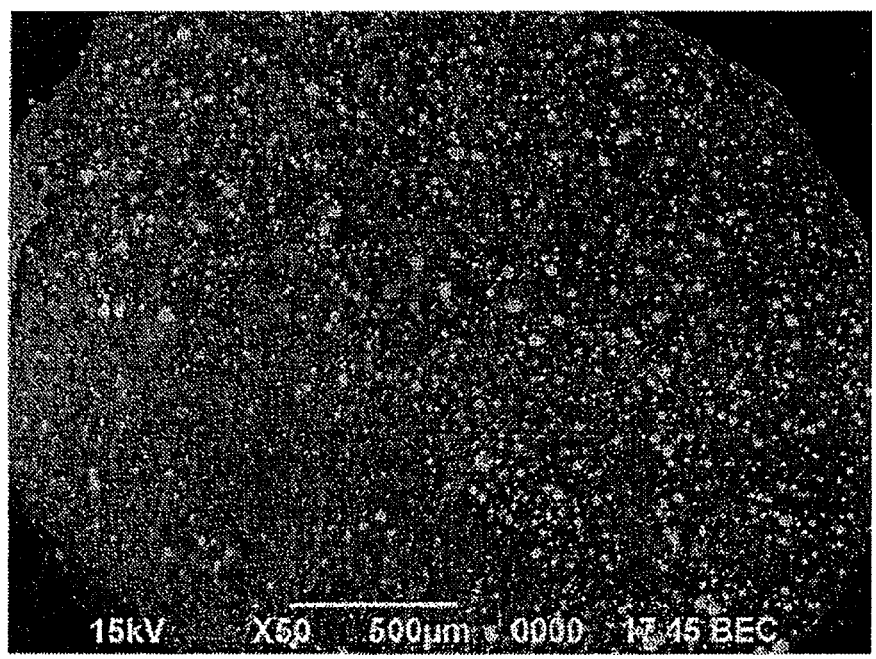

[Figure 4B]
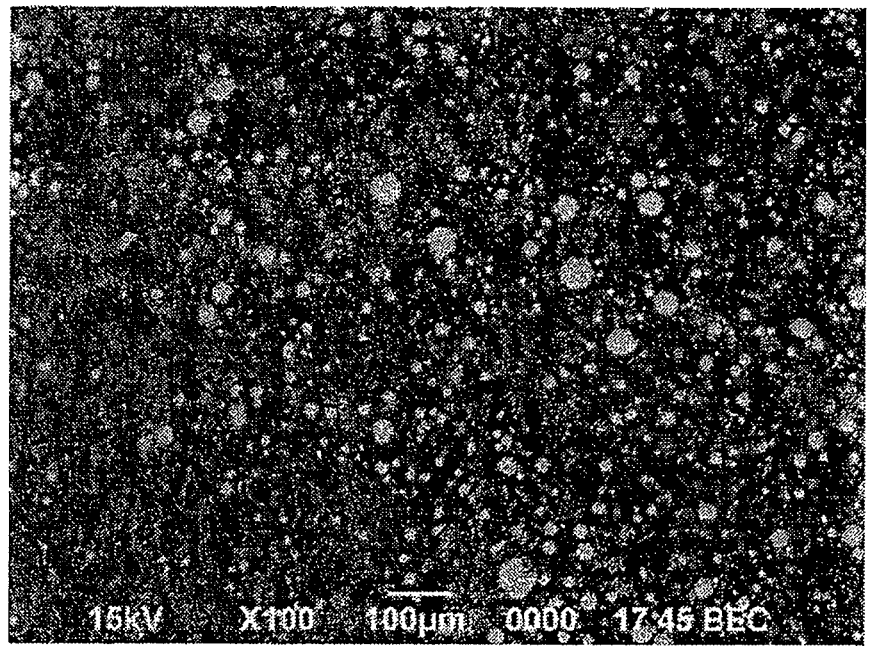
[Figure 4C]
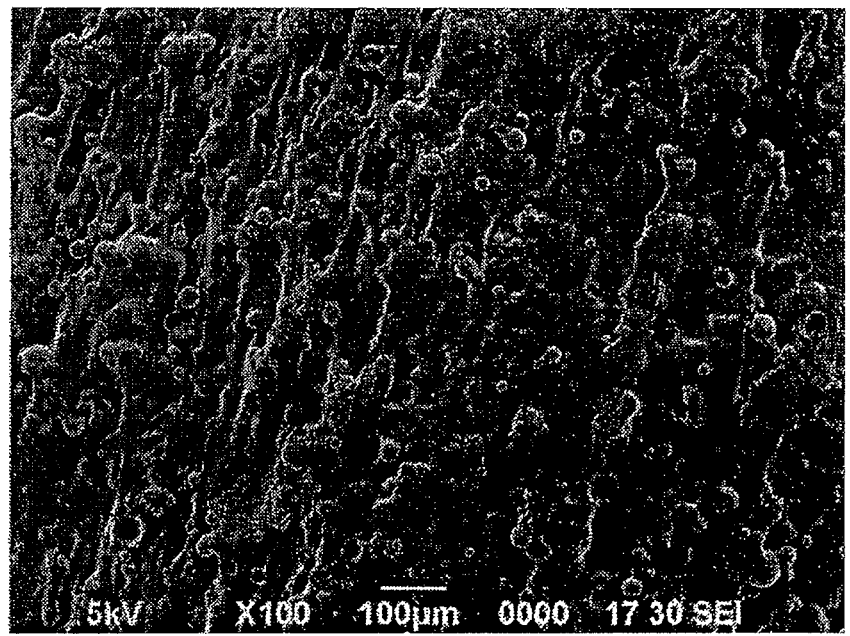

[Figure 5]
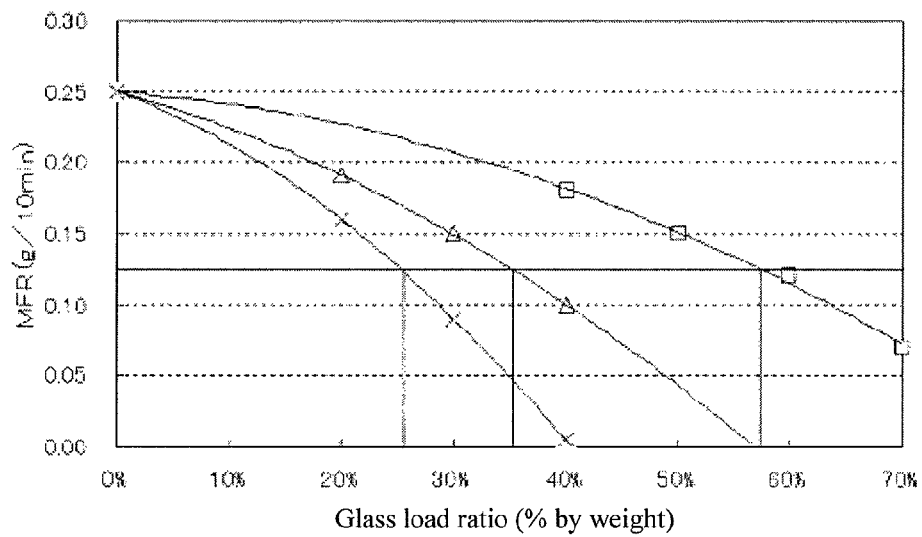
[Figure 6]
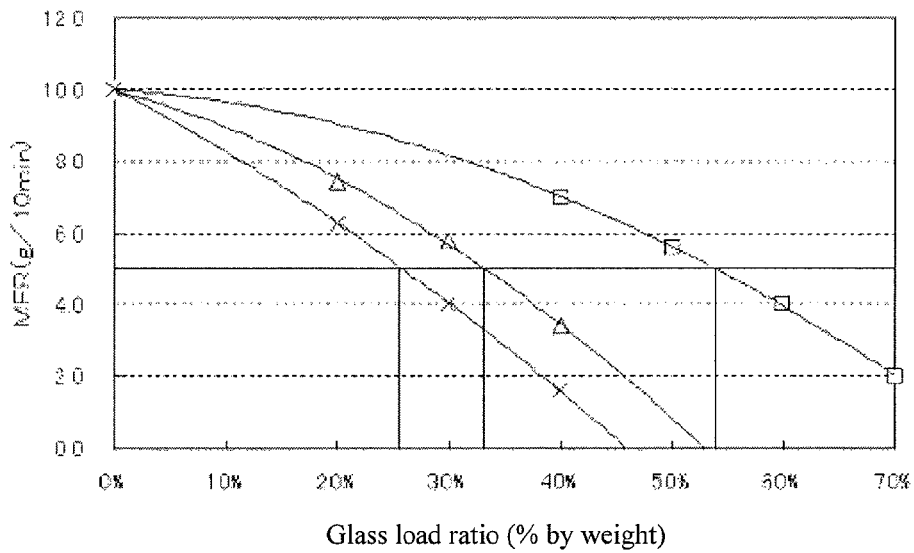

[Figure 7]
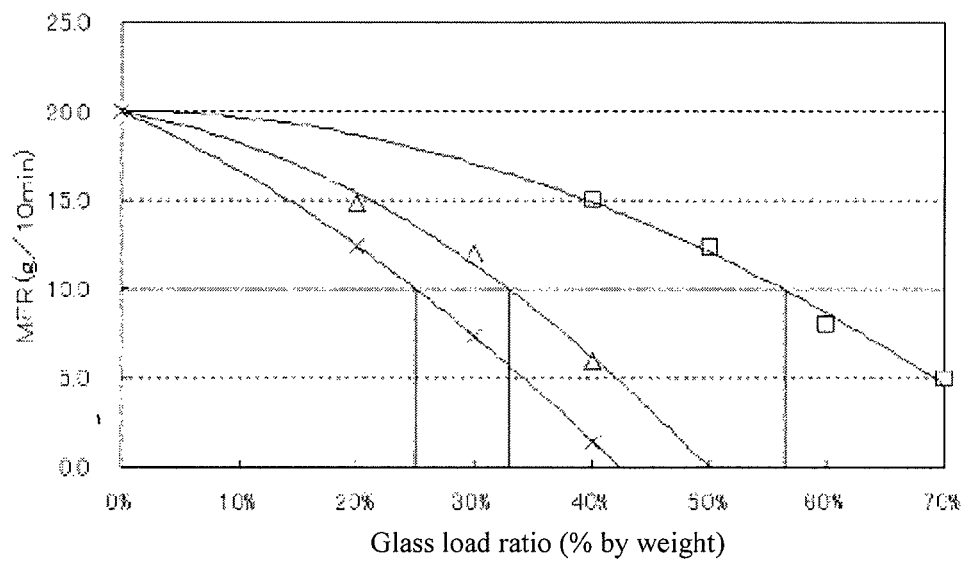
[Figure 8]
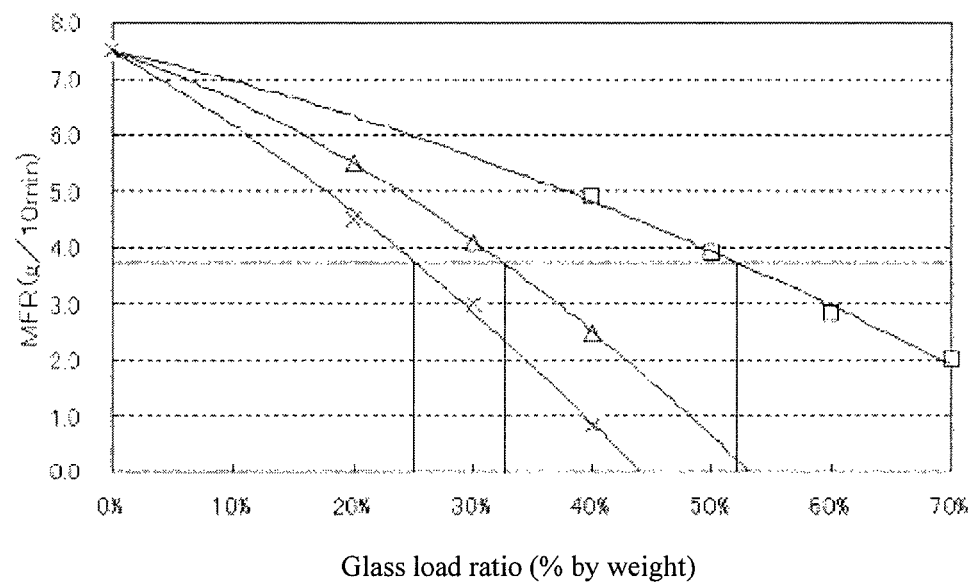

[Figure 9]
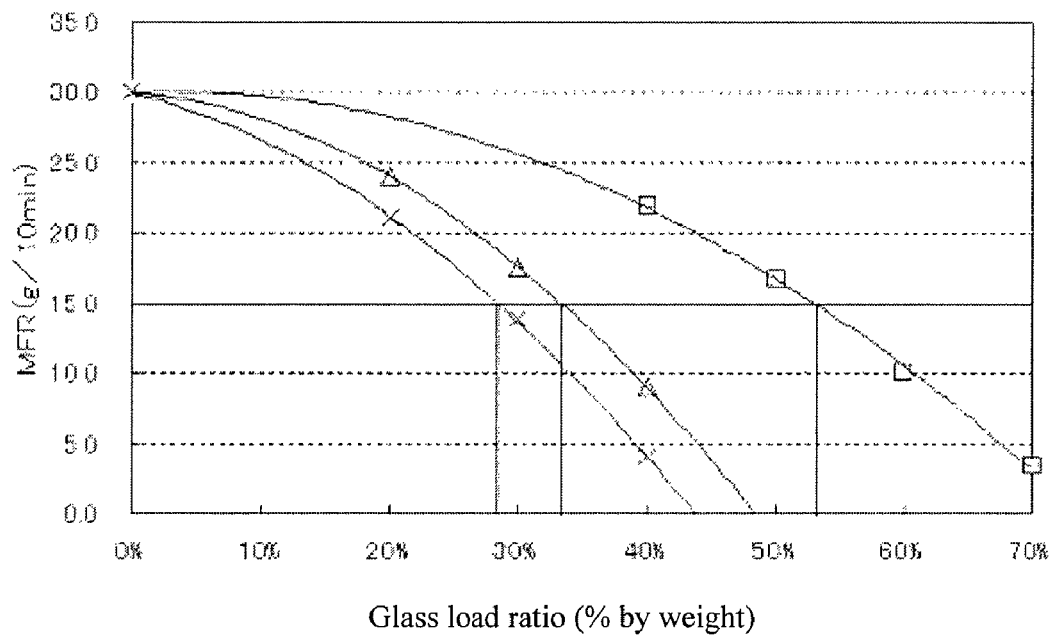
[Figure 10]
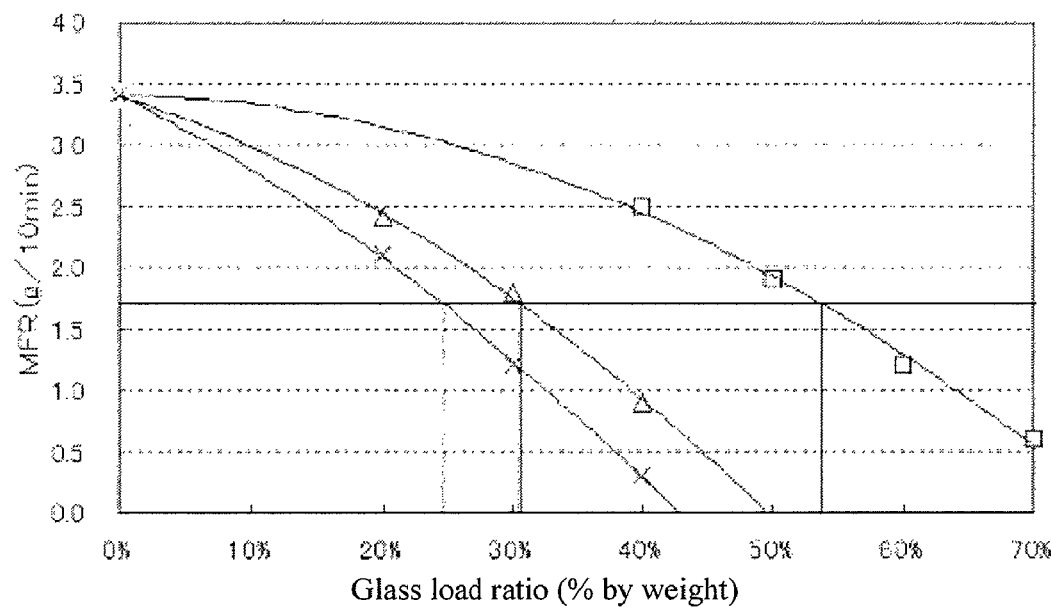

[Figure 11]
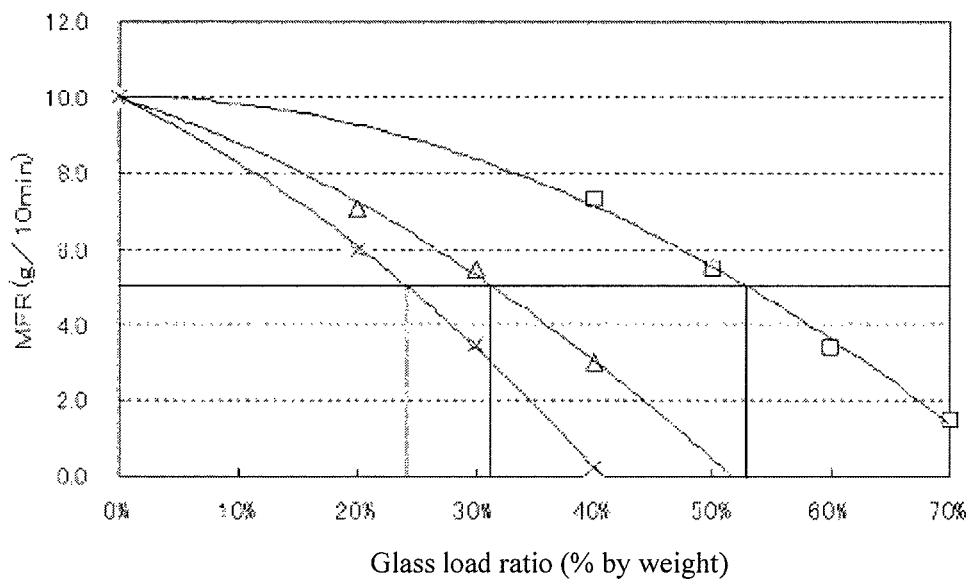
[Figure 12]
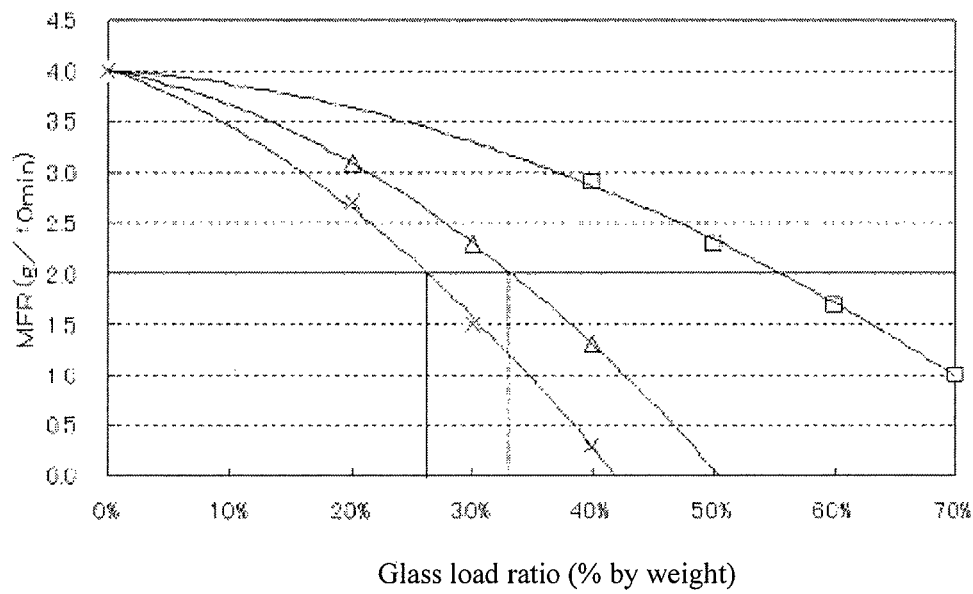

[Figure 13]
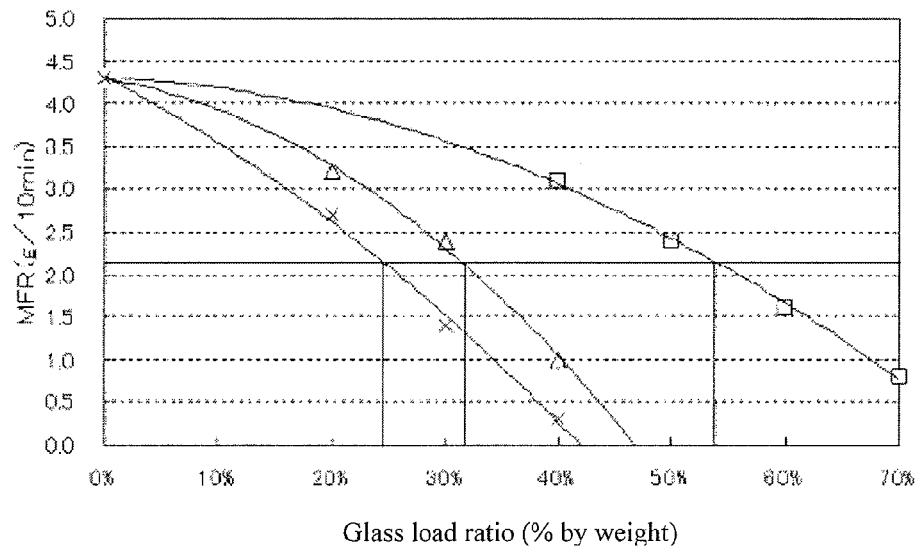
[Figure 14]
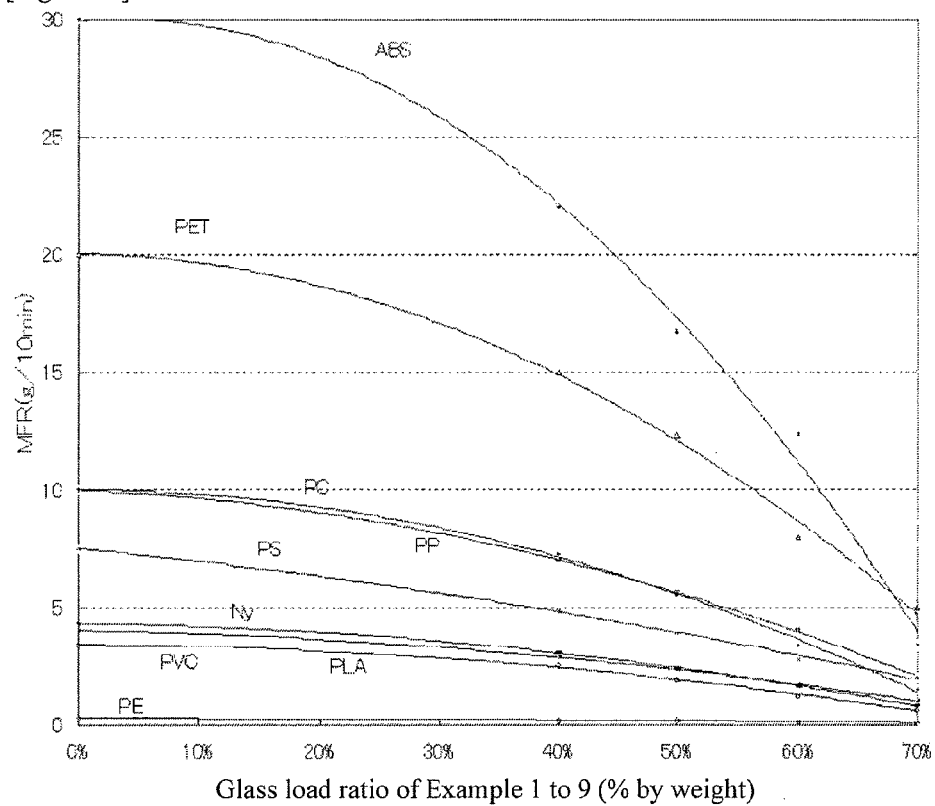

[Figure 15]
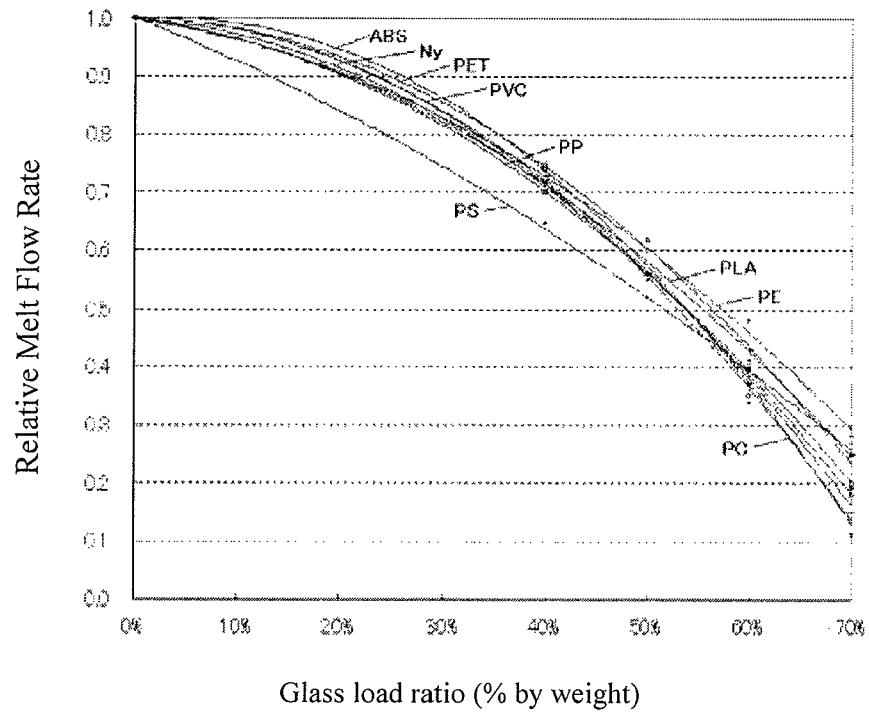
Glass load ratio (% by weight)
[Figure 16]
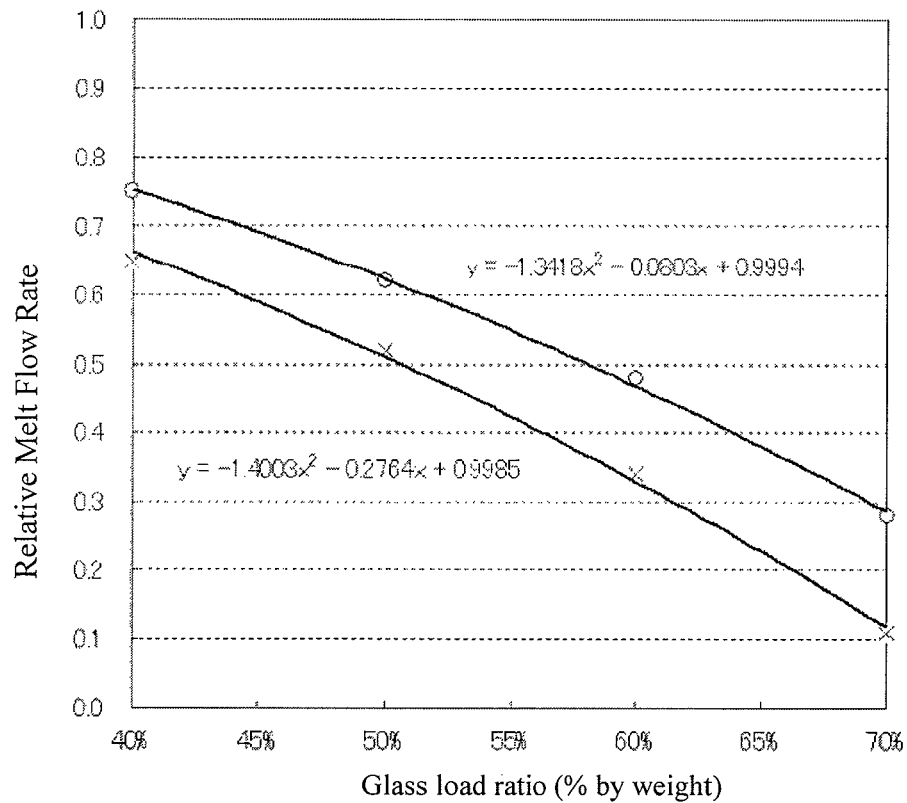
Glass load ratio (% by weight)

[Figure 17]
(Background Art)
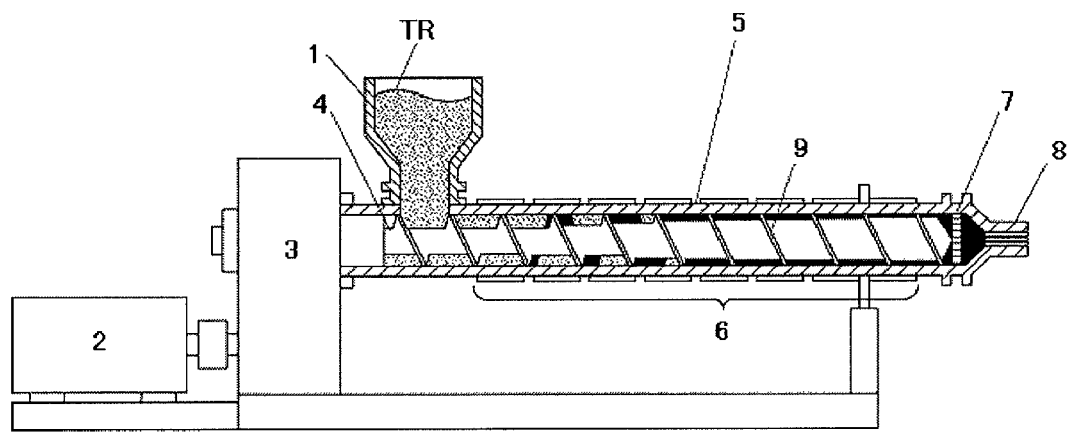

GLASS-CONTAINING MOLDING COMPOSITION AND PROCESS FOR PRODUCTION OF THE SAME

This application is the U.S. National Phase under 35 U.S.C. §371 of International Application PCT/JP2008/068093, filed Oct. 3, 2008, which claims priority to Japanese Patent Application No. 2007-260443, filed Oct. 4, 2007 and No. 2008-176589, filed Jul. 7, 2008. The International Application was published under PCT Article 21(2) in a language other than English.

TECHNICAL FIELD

The present invention relates to a glass-containing molding composition constituted by a thermoplastic resin containing a glass powder, obtained by kneading and extruding using an extruder, as well as a method for producing said composition. In particular, the present invention relates to a glass-containing molding composition constituted by a thermoplastic resin containing a spherical glass powder as a glass load ratio in a range of 40 to 70 percent by weight, as well as a method for producing said composition.

PRIOR ART

Plastics are polymer compounds synthesized from petroleum. Plastics are used as materials for various sundries, products for medical or industrial use and other mass-produced items, because they can be easily shaped using dies, etc.

Plastics can be used to synthesize resins having the performance suitable for various intended purposes and applications, and therefore the production volumes of plastics in Japan have been stable at approx. 14 million tons a year over the past several years.

Plastic productions in Japan in 2004 reached approx. 14.08 million tons, where polyethylene resin (hereinafter referred to as "PE") is the most popular type of plastics by production volume, followed by polypropylene resin (hereinafter referred to as "PP"), polyvinyl chloride resin (hereinafter referred to as "PVC"), polystyrene resin (hereinafter referred to as "PS"), polyethylene terephthalate resin (hereinafter referred to as "PET"), and ABS resin. Thermoplastic resins rank among the top plastics by production volume, and approx. 90% of all plastics produced are thermoplastic resins.

Global plastic productions in 2004 are estimated to have reached approx. 224 million tons, and plastic productions in Japan account for approx. 6.5% of this volume. By country, Japan is the third biggest producer of plastics next to the U.S. and Germany.

By region, plastic productions are growing rapidly in East Asia, and Asia ex-Japan has now surpassed Europe and North America as the largest plastic production region accounting for 35.5% of all plastics produced worldwide. As these figures show, productions of thermoplastic resins, which account for approx. 90% of all plastic productions, are expected to grow further.

The inventor contemplated day in, day out as to how we could solve some of the global issues that must be solved urgently, such as global warming caused by carbon dioxide, etc., and depletion of limited petroleum resource, and came up with one solution.

The solution was to produce a molding composition by blending a large amount of glass powder into a thermoplastic resin in such a way that, for example, the glass powder would account for 70%, and then kneading and extruding the mixture using an extruder. If the molded product made of thus obtained composition provides characteristics not available with conventional molded products, a new product that enriches our life can be provided and the usage of thermoplastic resin, or petroleum, can be reduced by 70%, because carbon dioxide emissions generated from incineration of such molded product can be reduced by 70%. Furthermore, glass powder remaining after the molded product has been incinerated can be recycled by reusing it in the form of adding to resin again.

In the field of plastic molding technology, however, it is considered not possible to produce a molding composition by mixing a large amount, or specifically 40% or more, of glass powder into a thermoplastic resin and then kneading and extruding the mixture using an extruder.

Before explaining why this is not possible, the structure of an extruder is explained, along with a step to mix a small amount of glass powder into a thermoplastic resin and knead and extrude the mixture using an extruder.

A traditional way to produce a molding composition by mixing a filler into a thermoplastic resin has been to mix both materials in a mixer, introduce the mixture into the hopper of an extruder, knead the filler into the thermoplastic resin that has been melted in a cylinder using a heater, and then extrude the kneaded mixture through a nozzle die positioned at the tip of the aforementioned extruder.

FIG. 17 shows the structure of a single-axis extruder which is one example of a conventional extruder used to implement the aforementioned process. The traditional step to extrude a thermoplastic resin using the aforementioned single-axis extruder is explained first, followed by the step to introduce a glass powder into the thermoplastic powder in the aforementioned extruder and knead and extrude the mixture. Glass powder is considered as a type of filler used to improve the physical properties of thermoplastic resins, and therefore a step to knead this conventional filler into the thermoplastic resin is used. Also, the problems associated with the kneading of glass powder into the thermoplastic resin are explained by referring to FIG. 17.

The key structure of this single-axis extruder is such that the machine comprises a hopper 1, motor 2, reduction gears 3, screw 4, cylinder 5, heater/blower (heating/cooling device) 6, etc., with a nozzle die 8 installed at the tip of the cylinder 5 via an adapter 7. Under the conventional method where only a thermoplastic resin is kneaded and extruded, the thermoplastic resin introduced to the hopper 1 is fed to the right along the threads of the screw 9, where a specific heater temperature is set according to the type of resin. The resin near the entrance from which it is introduced to the hopper 1 is in a solid state, but as it is fed to the right the resin is melted by the heater and thus becomes a half-molten state consisting of solids and liquid. The farther the resin is fed to the right, the more liquid the resin becomes. The resin existing in three states of solid, solid/liquid and liquid is kneaded continuously using the aforementioned screw, and then the kneaded resin is extruded in strands through the nozzle die 8 having 8 to 10 holes. The extruded strands are cooled in a cooling water bath and then cut to a pellet shape using a cutter to obtain pellets. (Refer to Non-patent Literature 1.)

In FIG. 17, pellets between the cylinder and screw are indicated by dots near the entrance to represent their solid state. As they move to the right, however, some black parts appear. These black parts represent resin in a liquid state. In the intermediate area, dots and black parts appear in isolated locations, but this is a simplified illustration for easy understanding. In reality, in this intermediate area the resin remains in a semi-molten state where solids and liquid are mixed.

Next, to obtain a molding composition by mixing glass powder into pellets, first the pellets and glass powder are weighed in a mixer and then the weighed materials are mixed uniformly to be introduced to the hopper. In many cases, the aforementioned glass powder has been silanated, meaning that glass fibers have been crushed into a powder form and then soaked in a liquid containing a silane compound to cover the fiber surface with the silane compound.

The aforementioned silane compound is constituted by an organic substance and silicon, and serves as an intermediary to bond organic and inorganic materials that are normally very difficult to bond. Accordingly, the traditional practice has been to silanate the glass powder before it is blended into the resin.

This silanated glass powder is introduced to the hopper. Because the frictional resistance of glass powder is high near the entrance of the hopper, however, the shearing force of the screw is used to feed both materials toward the die in a manner as if the glass powder is sand and it bites the sand, and once the mixed materials enter the heater/blower area, the heater provided in the outer tube of the cylinder is used to implement heating, thus causing the mixture near the inner tube of the cylinder to go into a liquid state where melted pellets are mixed with glass powder, with the mixture near the outer tube of the screw remaining in a solid state because pellets have not melted yet. However, these solid pellets near the outer tube of the screw and liquefied pellets near the inner tube of the cylinder are kneaded and agitated by the screw rotating at high speed and thus made into a semi-molten state where solid pellets and liquefied pellets are mixed. Accordingly, the presence of semi-molten pellets causes the flowability to drop near the entrance of the aforementioned heater/blower area, and therefore the frictional resistance acting in the direction opposite to the direction of the shearing force of the screw increases rapidly.

If a large amount of glass powder is added to pellets and the two are kneaded, the presence of this large amount of glass powder while the aforementioned pellets are still in a semi-molten state causes the flowability to drop rapidly, and the aforementioned frictional resistance relative to the screw increase to or above the shearing force of the screw. As a result, damage to the screw threads, etc., occurs and control of the kneading/compressing actions of the screw stops. This problem is well known among those skilled in the art. Since the aforementioned extruder is a very expensive machine costing 20 to 30 million yen per unit, damage, stopping or other problems pertaining to the extruder may incur significant losses in the form of costs for replacing parts, repair costs and inspection costs. In fear of these losses, in reality the manufacturers are limiting the glass powder load to 35 percent by weight at most.

For the above reasons, or specifically due to the rapid drop in flowability caused by blending and kneading a large amount of glass powder into a thermoplastic resin using an extruder for the purpose of improving the physical properties of the thermoplastic resin, in the field of plastic molding technology it is considered not possible to produce a thermoplastic resin composition containing a large amount of glass powder.

Accordingly, the inventor contemplated over and over the cause of this rapid drop in flowability that occurs when a large amount of glass powder is blended into a thermoplastic resin and the mixture is kneaded in an extruder, and came to a conclusion that probably the four factors specified below were interacting with one another to cause this sudden drop in flowability.

The first factor is that, as described above, a semi-molten state occurs where solids and liquid are mixed.

The second factor is that, as a way to perform the aforementioned silanation of glass powder, generally the soak method is used whereby glass powder is soaked for 30 minutes under agitation in an aqueous solution containing approx. 0.1 percent by weight of silane compound, after which the mixture is filtered and dried at 100° C. This process coats glass powder in a condition where multiple glass powder particles are contacting one another. Since the glass powder in this condition is filtered and dried, the silanated glass powder contains these glass powder particles that are aggregated (hereinafter referred to as "Aggregated Glass Powder Particles"). Presence of these aggregated glass powder particles may be playing a part.

The third factor is that because traditionally the glass powder blended into a thermoplastic resin is obtained by finely crushing glass fibers, the fibers can have varying shapes such as polygon and rectangle, and their average particle size also varies over a wide range from 10 to 100 µm. These varying shapes and wide size distribution may also be a cause.

Furthermore as the fourth factor, the specific heat of glass is very different from the specific heat of thermoplastic resin. For example, while the specific heat of glass is 0.670 J/(kg-K), the specific heat of PET is 1.5 J/(kg-K), meaning that PET requires 2.2 times more heat output than glass to reach a certain raised temperature. This large differential specific heat is another possible reason.

It is considered the complex interactions among the aforementioned four factors explain why blending and kneading 40 percent by weight or more of glass powder into a thermoplastic resin causes the flowability to drop rapidly, resulting in the inability to produce a molding composition containing glass powder.

By the way, the following technical literatures are known in relation to a molding composition constituted by a synthetic resin blended with glass powder, as well as a production method and other aspects thereof.

First, there is an invention relating to a heat-resistant resin composition used for sliding members, constituted by polyether ether ketone resin or other material, wherein said invention is intended to provide a sliding member for use in an area contacted by a soft metal member where the sliding member will reduce the wear of the mating soft metal member as well as wear of the sliding member itself. This is achieved by blending into a heat-resistant resin 5 to 60 percent by weight, or preferably approx. 10 to 40 percent by weight, of spherical glass having an average particle size of 20 to 100 µm, and then melting and mixing the mixture using an extruder to produce pellets, after which the pellets are used to form a sliding member by means of injection molding. It is explained, however, that when spherical glass is used by the aforementioned ratios or more, the moldability will be lost. In the examples cited, therefore, the blending ratio of spherical glass that has been amino-silanated is adjusted to 15 or 30 percent by weight. (Refer to Patent Literature 1.)

There is also an invention relating to a resin composition mainly constituted by polytetrafluoroethylene resin used for sliding members. Intended for a purpose similar to the one described in Patent Literature 1, this invention proposes blends in the aforementioned polytetrafluoroethylene resin 5 to 60 percent by weight, or preferably approx. 10 to 40 percent by weight, of spherical glass having an average particle size of 10 to 100 µm. In the examples cited, the blending ratio of spherical glass that has been amino-silanated is adjusted to 10 or 20 percent by weight. (Refer to Patent Literature 2).

Another invention relates to a high-thermoconductive resin composition used for thermoconductive substrates on which heat-generating electrical components are mounted, radiating fins and the like. This invention is designed to address the need for an insulation later between a metal substrate and a circuit pattern to prevent short-circuiting of the substrate and pattern, where such insulation later usually has high heat resistance and therefore reduces the heat conductivity of the substrate as a whole. Another problem this invention aims to solve is the fact that such insulation layer is thin, typically having a thickness of around 100 and therefore it cannot provide reinforced insulation. This invention solves these problems through a high-thermoconductive resin composition produced by kneading into a thermoplastic resin 60 to 85 percent by weight, to the total weight, of an inorganic filler of spherical shape which has an average particle size of 10 to 50 μm and is constituted by alumina or other substance having high heat conductivity. Furthermore, a silane-coupling layer is formed on the surface of the aforementioned spherical inorganic filler to add hydrophobic property, thereby preventing the drop in wettability relative to the thermoplastic resin while improving the water resistance of the inorganic filler. This composition is used to provide an insulation layer with a thickness of 100 μm, where the composition is compression-molded into a desired shape. (Refer to Patent Literature 3.)

Yet another invention relates to a thermoplastic resin composition used at relatively high molding temperatures of 270 to 300° C. For the purpose of providing such composition offering excellent antibacterial property and exterior surface, this invention proposes a method to use a super-mixer, etc., to mix pellets, etc., of a polyester resin with a soluble phosphate glass powder containing $Ag_2O$, and then pelletize the mixture by means of heating, melting and kneading using an extruder or other kneading machine. The literature cites an experiment of using this method to form a molded product via an injection-molding machine using a thermoplastic resin composition constituted by a heat-resistant resin containing 0.1 to 40 percent by weight of a soluble phosphate glass powder containing $Ag_2O$. (Refer to Patent Literature 4.)

There is another invention relating to a production method of thermoplastic resin composition, intended to improve dimensional stability, warping property, mechanical characteristics and whiteness in a balanced manner. It is described that crushed porous glass powder in a flaky form should be added as a filler by 5 to 30 percent by weight, and that any higher load of glass powder would make it difficult to injection-mold or otherwise process the composition. (Refer to Patent Literature 5.)

One invention relates to a polycarbonate resin composition containing a glass filler, and a molded product made of said composition, where the composition offers excellent transparency and strength. One problem with traditional methods is that when a polycarbonate resin is combined with E glass added as a glass filler, the differential refractive index between the two materials results in lower transparency of the molded polycarbonate resin product reinforced with E glass. This invention proposes a polycarbonate resin composition where a polycarbonate resin is blended with a glass filler having a differential refractive index of 0.001 or less, by 10 to no more than 40 percent by mass. It is described that adding the glass filler by more than 40 percent by mass is not desirable, because it would cause the moldability to drop. (Refer to Patent Literature 6.)

Another invention is disclosed that relates to a resin composition constituted by 100 parts by mass of a resin blended with 0.5 to 100 parts by mass of a glass powder having an average particle size of 0.5 to 5.0 μm, wherein said invention is intended to add excellent flame resistance or property to suppress smoke generation. To be specific, this invention adds glass powder 1 to 50 percent by weight to resin, where the aforementioned glass powder is produced by the soak method by crushing glass cullet and then soaking the crushed glass cullet in a silane-coupling agent.

As an example, it is cited that a resin composition can be formed by melting and kneading 100 parts by mass (67 percent by weight) of polyvinyl chloride resin and 50 parts by mass (33 percent by weight) of glass powder, and then processing this resin composition using a flat-plate press-molding machine to produce a molded vinyl chloride product. (Refer to Patent Literature 7.)

Another invention relates to a production method of spherical inorganic powder. Traditionally inorganic powder made of crushed glass fibers, etc., is used as a filler for composite materials for printed wiring boards, sealing materials, etc., for the purpose of improving dimensional stability and heat resistance, among others. However, such powder has limitations as a high-load filler. To solve this problem, this invention proposes a production method whereby an inorganic substance containing silicon oxide is crushed to form a crushed material, and this crushed material is heated in an atomized state to perform spheroidization to form a spherical material, thereby producing a spherical inorganic substance containing silicon oxide. Because the aforementioned inorganic substance containing silicon oxide can be shaped into a spherical form, it becomes possible to create a molded epoxy resin product via compression molding using a thermosetting epoxy resin and 85 percent by weight of such spherical inorganic substance. However, it is described that forming an epoxy resin composition containing 70 percent by weight of such spherical inorganic substance is undesirable because the resin viscosity increases and molding becomes not possible. It is also described that this spherical inorganic powder can be used as a filler for composite materials for printed wiring boards, sealing materials, etc.
(Refer to Patent Literature 8.)
[Non-patent Literature 1] Haruo Sasaki, "*Hoso Gijutsu Binran* (Handbook of Packing Technology)," NHK, Jul. 1, 1995, pp. 1062, 1078, 1079
[Patent Literature 1] Japanese Patent Laid-open No. Hei 08-291257
[Patent Literature 2] Japanese Patent Laid-open No. Hei 10-45989
[Patent Literature 3] Japanese Patent Laid-open No. Hei 10-139928
[Patent Literature 4] Japanese Patent Laid-open No. 2001-139832
[Patent Literature 5] Japanese Patent Laid-open No. 2002-356620
[Patent Literature 6] Japanese Patent Laid-open No. 2006-22236
[Patent Literature 7] Japanese Patent Laid-open No. 2006-62945
[Patent Literature 8] Japanese Patent Laid-open No. 2007-51019

SUMMARY OF THE INVENTION

Problems to be Solved by the Invention

Patent Literatures 1 and 2 referenced above argue that when a heat-resistant resin is blended with 5 to 60 percent by weight of spherical glass, and especially when 40 percent or more of spherical glass is used, the moldability would be reduced. However, the examples presented only show experimental results of blending up to 30 percent by weight of spherical glass. Also, they do not present any technology to prevent sudden drop in flowability caused by blending a large amount of glass powder into a heat-resistant resin, or any composition, produced by employing such technology, that is constituted by a heat-resistant resin containing spherical glass in a range of 40 to 70 percent by weight.

Patent Literature 3 referenced above proposes a high-thermoconductive resin composition used for electronics components, where a thermoplastic resin is kneaded with 60 to 85 percent by weight, relative to the total weight, of an inorganic filler constituted by alumina or other substance having high heat conductivity, and then the aforementioned composition is molded via compression molding into an insulation layer with a thickness of 100 However, the composition is not extruded using an extruder, and the material blended with the thermoplastic resin is not glass powder, but an inorganic filler constituted by alumina or other substance having high heat conductivity.

Patent Literature 4 referenced above describes injection molding using a thermoplastic resin composition constituted by a thermoplastic resin containing 0.1 to 40 percent by weight of soluble phosphate glass powder. However, it does not present any technology to prevent sudden drop in flowability caused by blending a large amount of glass powder into a thermoplastic resin, or any composition, produced by employing such technology, that is constituted by a thermoplastic resin containing spherical glass in a range of 40 to 70 percent by weight.

Patent Literatures 5 and 6 referenced above argue that adding glass powder by 30 percent by mass to 40 percent by mass, or more, to a thermoplastic resin would result in lower moldability. However, they do not present any technology to prevent sudden drop in flowability caused by blending a large amount of glass powder into a thermoplastic resin, or any composition, produced by employing such technology, that is constituted by a thermoplastic resin containing spherical glass in a range of 40 to 70 percent by weight.

Patent Literature 7 referenced above presents, in Example 12, a resin composition constituted by a thermosetting resin containing glass powder 50 percent by weight, as well as an experiment of producing a molded product on a flat-plate press-molding machine using this resin composition. However, the resin in question is a thermosetting resin, not a thermoplastic resin, and the method is compression molding, not extrusion molding using an extruder.

Patent Literature 8 referenced above describes that a molded epoxy resin product usable as printed wiring boards, sealing materials, etc., for electronic components can be created by mixing a thermosetting epoxy resin with 85 percent by weight of a spherical inorganic substance and then compression-molding the mixture, and that the aforementioned spherical inorganic substance can be used as a filler for electronic components. However, the aforementioned epoxy resin is a thermosetting resin, not a thermoplastic resin that can be used as a molding composition, and the method to make the molded product is compression molding, not extrusion molding using an extruder.

As explained above, in the field of thermoplastic resin molding technology, only glass-containing molding compositions containing glass powder less than 40 percent by weight are available at the present, and it is shown, from Patent Literatures 1 to 8 referenced above, that a glass powder load of more than 40 percent by weight in a thermoplastic resin would result in lower moldability as far as a glass-containing thermoplastic resin composition produced by kneading and extrusion using an extruder is concerned. No invention is heretofore known that presents a composition or production method thereof for blending such thermoplastic resin with a large amount, or specifically 40 percent by weight or more, of glass powder by removing the aforementioned four factors that cause a rapid drop in flowability. Needless to say, no characteristics are heretofore known pertaining to a composition containing a large amount, or specifically 40 percent by weight or more, of glass powder.

Because of this, the present invention aims to provide a glass-containing molding composition constituted by a thermoplastic resin containing glass powder as a glass load ratio in a range of 40 to 70 percent by weight, as well as a method for producing said composition that enables its molding, even when glass powder is blended as a glass load ratio in a range of 40 to 70 percent by weight, and the characteristics of said molded glass-containing molding composition, by means of removing the factors of rapid drop in flowability arising from an increased load of glass powder introduced into the thermoplastic resin as explained above. As a result, the present invention presents one solution to some of the global issues that must be solved urgently, such as global warming caused by carbon dioxide, etc., and depletion of limited petroleum resource.

Means for Solving the Problems

The inventor thought that the complex interactions among the aforementioned four factors of lower flowability explain why blending and kneading 40 percent by weight or more of glass powder into a thermoplastic resin causes the flowability to drop rapidly, thereby resulting in the inability to produce a molding composition containing glass powder. Accordingly, the inventor studied diligently to find solutions to remove the aforementioned four factors of rapid drop in flowability and consequently accomplished the present invention.

To be specific, an invention of a glass-containing molding composition pertaining to Embodiment 1, designed to solve the aforementioned problems, is a glass-containing molding composition produced by kneading a glass powder and a thermoplastic resin and then extruding the kneaded mixture using an extruder, wherein said glass-containing molding composition is characterized in that the glass powder is constituted by particles that are solid and have a spherical shape and an average particle diameter of 10 to 40 μm, are coated by a silane compound over their entire surface, are incorporated in the thermoplastic resin at a glass load ratio of 40 to 70 percent by weight, exhibit reduction ratios of melt flow rate which gradually reduces on a parabolic curve with an increase of the glass load ratio, and have a reduction ratio of melt flow rate in a range of 3/4 to 1/4 within a glass load ratio of 40 to 64 percent by weight.

Similarly, an invention of a glass-containing molding composition pertaining to Embodiment 2 is characterized in that the reduction ratio of melt flow rate shows a value of 1/2 within a glass load ratio of 53 to 57 percent by weight.

An invention of a glass-containing molding composition pertaining to Embodiment 3 is characterized in that the reduction ratio of melt flow rate shows a value in a range of 3/4 to more than 1/2 within a glass load ratio of 40 to 52 percent by weight and less than 1/2 to 1/4 within a glass load of 58 to 64 percent by weight.

An invention of a glass-containing molding composition pertaining to Embodiment 4 is characterized in that the reduction ratio of melt flow rate that gradually reduces with an increase of the glass load ratio shows a value falling within the range defined by equations (1) and (2) below:

$$y = -1.3418x^2 - 0.0803x + 0.9994 \quad (1)$$

$$y = -1.4003x^2 - 0.2764x + 0.9985 \quad (2)$$

x: Glass load ratio ($0.4 \leq x \leq 0.7$)
y: Reduction ratio of melt flow rate.

An invention of a glass-containing molding composition pertaining to Embodiment 5 is a glass-containing molding composition produced by kneading a glass powder and a thermoplastic resin and then extruding the kneaded mixture using an extruder, wherein the glass-containing molding composition is characterized in that the glass powder is constituted by particles that are solid and have a spherical shape and an average particle diameter of 10 to 40 μm, are coated by a silane compound over their entire surface, are incorporated in the thermoplastic resin at a glass load ratio of 40 to 64 percent by weight, and are independently and uniformly dispersed therein.

An invention of a glass-containing molding composition pertaining to Embodiment 6 is characterized in that a side face of the glass-containing molding composition is covered by spherical convex shapes and these spherical convex shapes are made of the thermoplastic resin and cover the spherical glass powder.

An invention of a glass-containing molding composition pertaining to Embodiment 7 is characterized in that the glass powder is E glass powder.

An invention of a glass-containing molding composition pertaining to Embodiment 8 is characterized in that the silane compound is expressed by the formula below:

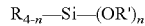

$$R_{4-n}\text{---Si---}(OR')_n$$

wherein R indicates an organic group, R' indicates a methyl group, ethyl group or propyl group, and n is an integer selected from a range of 1 to 3.

An invention of a glass-containing molding composition pertaining to Embodiment 9 is characterized in that the reduction ratio of melt flow rate shows a value in a range of 3/4 to 1/4 within a glass load ratio of 40 to 64 percent by weight.

An invention of a glass-containing molding composition pertaining to Embodiment 10 is characterized in that the reduction ratio of melt flow rate shows a value of 1/2 within a glass load ratio of 53 to 57 percent by weight.

An invention of a glass-containing molding composition pertaining to Embodiment 11 is characterized in that the reduction ratio of melt flow rate shows a value in a range of 3/4 to more than 1/2 within a glass load ratio of 40 to 52 percent by weight, and the reduction ratio of melt flow rate shows a value in a range of less than 1/2 to 1/4 within a glass load ratio of 58 to 64 percent by weight.

An invention of a glass-containing molding composition pertaining to Embodiment 12 is characterized in that the glass-containing molding composition is used as a molding composition for blow molding, injection molding, extrusion molding, vacuum molding, or press molding.

An invention of a glass-containing molding composition pertaining to Embodiment 13 is characterized in that the thermoplastic resin is selected from the group consisting of polyethylene resins, polypropylene resins, polyester resins, polystyrene resins, ABS resins, polyvinyl chloride, polyamide resins, polycarbonate resins, and polylactic acid resins.

An invention of a method for producing a glass-containing molding composition pertaining to Embodiment 14 is a method for producing a glass-containing molding composition produced by kneading a glass powder and a thermoplastic resin and then extruding the kneaded mixture using an extruder, characterized by comprising:

a step to obtain a spherical glass powder covered by a silane compound by spraying an atomized product of glass fiber into high-temperature flame, thereby forming spherical shapes, and spraying silane compound-containing water thereon;

a step to introduce a weighed amount of thermoplastic resin into the extruder and melt the thermoplastic resin;

a step to weigh the spherical glass powder in a range of a glass load ratio of 40 to 70 percent by weight and preheat the spherical glass powder; and a step to obtain a glass-containing molding composition by introducing the preheated spherical glass powder inside the extruder in a region where the thermoplastic resin is in a molten state, and then kneading the mixture.

An invention of a method for producing a glass-containing molding composition pertaining to Embodiment 15 is characterized in that the temperature of the high-temperature flame is 2,500 to 3,000° C., and the water contains the silane compound in an amount of 0.1 percent by weight.

An invention of a method for producing a glass-containing molding composition pertaining to Embodiment 16 is characterized in that the temperature of the preheating of the spherical glass powder is preferably a melting temperature of the thermoplastic resin ±10%, and more preferably the melting temperature of the thermoplastic resin.

An invention of a method for producing a glass-containing molding composition pertaining to Embodiment 17 is characterized in that the thermoplastic resin is selected from the group consisting of polyethylene resins, polypropylene resins, polyester resins, polystyrene resins, ABS resins, polyvinyl chloride, polyamide resins, polycarbonate resins, and polylactic acid resins.

Effects of the Invention

It has been considered not possible, under conventional methods, to blend glass powder more than 40 percent by weight into a thermoplastic resin to obtain a glass-containing molding composition containing 40 percent by weight or more of glass powder. However, it is possible to obtain a glass-containing molding composition containing glass powder in a range of 40 to 70 percent by weight.

This allows for reduction by up to 70% of carbon dioxide emissions generated when a molded product formed by such glass-containing molding composition is incinerated, which contributes significantly as a technology to solve global warming that presents a challenge on a global scale.

Also, a glass-containing molding composition conforming to the present invention can reduce the use quantity of thermoplastic resin, or petroleum, by up to 70%, which contributes significantly as a technology to solve depletion of limited petroleum resource that presents another challenge on a global scale.

Furthermore, glass-containing molding composition conforming to the present invention allows up to 70% of glass powder remaining after the incineration of a molded product to be added to resin to form a glass-containing molding composition again. Since 70% of glass powder can be recycled as many times as desired, the present invention also contributes significantly as a technology to build a recycling society.

Moreover, materials to make spherical glass powder are abundantly available in Japan and their costs are low. Accordingly, the present invention makes these materials as promising alternatives to oil whose price continues to rise.

The present invention makes it possible to mold any type of thermoplastic resin containing glass powder to a glass load ratio of 40 to 70 percent by weight, regardless of the MFR value.

A production method conforming to the present invention allows a composition to be produced by introducing a preheated spherical glass powder into an region where the thermoplastic resin is in a molten state, and the kneading the mixture, even when the glass powder is introduced as a glass load ratio in a range of 40 to 70 percent by weight, thereby presenting a simple, low-cost molding method not requiring the complex temperature control and other items in the conventional kneading process.

A molded product made of a glass-containing molding composition conforming to the present invention can be incinerated by keeping the heat generation from incineration to a low level, because while the melting point of the component glass powder is 1000° C. or above, the melting point of the component thermoplastic resin is approx. 300° C. This helps reduce the burden on the incinerating furnace.

Furthermore, a glass-containing molding composition conforming to the present invention, constituted by a thermoplastic resin containing glass powder in a range of 40 to 70 percent by weight, presents a new material not heretofore available on the earth. Accordingly, a molded product offering new characteristics not achievable by conventional molded products made it possible by using such new material.

In the present invention, by adopting a melt flow rate reduction ratio, flow properties of glass containing molding compositions can be systematically understood, if an MFR reduction ratio is selected a glass load ratio of spherical glass powder to be introduced to a resin can be estimated, and improving glass containing molding composition as well as operation of forming glass containing molded bodies became possible.

In order to obtain a glass containing molding composition having a melt flow rate reduction ratio of 1/2, spherical glass powder at a glass load ratio in a range of 53 to 57 percent by weight should be introduced to 100% thermoplastic resin, which improves the glass containing molding composition as well as operation of forming glass containing molded bodies, and can also reduce global warming and depletion of limited petroleum resource issue.

In order to obtain a glass containing molding composition having a melt flow rate reduction ratio of 1/4 or more, spherical glass powder at a glass load ratio of up to 64 percent by weight should be introduced to 100% thermoplastic resin, which can prevent troubles such as a screw being damaged.

BRIEF DESCRIPTION OF THE DRAWINGS

FIG. 1 Longitudinal section view of an extruder that can be used to implement a method for producing a glass-containing molding composition, and molding the composition, in conformance with the present invention.

FIG. 2 Graph showing the average particle size distribution of spherical E glass powder FIG. 3 ×1000 electron microscope image of spherical E glass powder.

FIG. 4A ×50 electron microscope image of the cut surface of a pellet that has been cut vertically from side, where the pellet was obtained by blending 50 percent by weight of spherical E glass powder with PP.

FIG. 4B ×100 electron microscope image of the aforementioned cut surface.

FIG. 4C ×100 electron microscope image of the side face of the aforementioned pellet.

FIG. 5 Graph showing the relationship of glass load ratio and MFR for PE.

FIG. 6 Graph showing the relationship of glass load ratio and MFR for PP.

FIG. 7 Graph showing the relationship of glass load ratio and MFR for PET.

FIG. 8 Graph showing the relationship of glass load ratio and MFR for PS.

FIG. 9 Graph showing the relationship of glass load ratio and MFR for ABS.

FIG. 10 Graph showing the relationship of glass load ratio and MFR for PVC.

FIG. 11 Graph showing the relationship of glass load ratio and MFR for PC.

FIG. 12 Graph showing the relationship of glass load ratio and MFR for PLA.

FIG. 13 Graph showing the relationship of glass load ratio and MFR for Ny.

FIG. 14 Graph showing the relationship of glass load ratio and MFR for glass-containing molding composition in Examples 1 to 9.

FIG. 15 Graph showing the relationship of reduction ratio of MFR and glass load ratio for glass-containing molding composition in Examples 1 to 9.

FIG. 16 Graph showing two quadratic polynomial lines approximating the maximum value and minimum value in the relationship of reduction ratio of MFR and glass load ratio for glass-containing molding composition in Examples 1 to 9.

FIG. 17 Longitudinal section view of a single-axis extruder provided as an example of a conventional extruder

BEST MODE FOR CARRYING OUT THE INVENTION

Before explaining the best mode for carrying out the present invention, the solutions to remove the aforementioned four factors—solutions the inventor discovered through diligent study—are explained.

An overview of the process to form a glass-containing molding composition is as follows.

A glass-containing molding composition with a glass load ratio in a range of 40 to 70 percent by weight is achieved through: the first step where glass fibers are crushed and the crushed material is sprayed into high-temperature flames of an oxygen provided inside a furnace to produce spherical glass powder particles, and then water containing a silane compound is injected onto the atomized spherical particles to obtain a spherical powder covered by the silane component over its entire surface; the second step where a weighed amount of thermoplastic resin is introduced into an extruder; the third step where a weighed amount of the aforementioned spherical glass powder as a glass load ratio in a range of 40 to 70 percent by weight is preheated and then introduced into the extruder to be kneaded; and the fourth step where the kneaded material is extruded to obtain a glass-containing molding composition.

A glass-containing molding composition with a glass load ratio in a range of 40 to 70 percent by weight can be formed without causing the flowability to drop after the introduction of a large amount of glass powder to thermoplastic resin by: introducing a large amount of glass in a region where the thermoplastic resin is molten in order to address the aforementioned first factor of sudden drop in flowability, or generation of a semi-molten state where solids and liquid are mixed (corresponding to the third step); covering the surface of individual glass powder particles with a silane compound in order to address the second factor, or presence of aggregated glass powder particles (corresponding to the first step); introducing a glass powder having a spherical shape and narrower particle size distribution in order to address the third factor, or varying shapes and wide size distribution of glass powder particles (corresponding to the first process); and preheating the spherical glass powder and introducing it into the extruder as a glass load ratio in a range of 40 to 70 percent by weight in order to address the fourth cause, or large differential specific heat (corresponding to the fourth step). The best mode for carrying out the present invention is explained in details below by specifically illustrating the aforementioned first to fourth steps.

(Process for Molding a Glass-Containing Molding Composition)

FIG. 1 provides a longitudinal section view of an extruder that can be used to implement a method for producing a glass-containing molding composition, and molding the composition, in conformance with the present invention. The aforementioned extruder produces a glass-containing molding composition by kneading and extruding thermoplastic resin a mixture containing spherical glass powder in a range of 40 to 70 percent by weight.

The process for molding a glass-containing molding composition by kneading and extruding thermoplastic resin a mixture containing spherical glass powder in a range of 40 to 70 percent by weight is explained based on the extruder shown in FIG. 1.

This extruder used in an embodiment of the present invention is equipped with two hoppers for introducing the materials, or specifically pellets (TR) and spherical glass powder (G). The hoppers of the extruder shown in FIG. 1 are called the "First Hopper" (1a) and "Second Hopper," (1b) respectively, from the left, where pellets of the thermoplastic resin (TR) is introduced to the first hopper (1a), while the spherical glass powder is introduced to the second hopper (1b) provided near the center of the extruder. The second hopper (1b) is provided in a position where the pellets supplied into the screw barrel from the first hopper are melted by the kneading and transfer action of the screw.

In the above, the extruder shown in FIG. 1 is structurally identical to the conventional extruder shown in FIG. 19, except for the hopper structures, and therefore the structure of the extruder in FIG. 1 is not explained.

Extruders having the aforementioned first and second hoppers have traditionally been known for use in extrusion molding by blending a resin material with several types of fillers, pigments, etc. One difference between the first and second hoppers under the present invention and those of a conventional extruder is that while the second hopper of a conventional extruder is small because the blending ratios of fillers, etc., are extremely small relative to the blending quantity of pellets, the second hopper under the present invention is equal to or larger than the first pellet hopper in order to introduce a large amount of spherical glass powder. Another difference is that a heating device (not illustrated) is provided above this hopper to preheat the spherical glass powder. The aforementioned heating device can be any heating device normally used, as long as it can heat the spherical glass powder to temperatures in a range of 150 to 350° C. and control the temperature at a constant level.

In the case of the second hopper of a conventional extruder, fillers, pigments, etc., are introduced at normal temperature. Under the present invention, however, the spherical glass powder is introduced to the second hopper after having been preheated to a temperature equal to or close to the melting temperature of the thermoplastic resin. It is most desirable that this preheating temperature be the same as the melting temperature of the thermoplastic resin (in a range of melting temperature ±10%). If the preheating temperature is lower than this range, flowability may drop because the large amount of glass powder takes heat from the molten thermoplastic resin. If the preheating temperature is higher than the aforementioned range of "melting temperature ±10%," on the other hand, the viscous resistance of the thermoplastic resin may drop excessively, thereby causing the resin to become liquid and preventing the formation of pellets. Accordingly, "melting temperature ±10%" is an appropriate range of glass-powder preheating temperatures.

First, the amount of pellets to be supplied is weighed according to the specified blending ratio of thermoplastic resin and glass, and introduced into the first hopper, after which the spherical glass powder is preheated to a temperature equivalent or close to the melting temperature of the thermoplastic resin and introduced into the second hopper at the position of the second hopper, or specifically the position where the pellets fed by the kneading and transfer action of the screw are melted by the heater. The molten thermoplastic resin, and spherical glass powder introduced into it, are kneaded and the mixture is extruded to produce a glass-containing molding composition, which is then cut to obtain pellets.

The temperature of the aforementioned heater is determined according to the melting point of the thermoplastic resin used. For example, this temperature is 230° C. for HD-PE, 220° C. for PP and 250° C. for PET, among others. The blended materials were kneaded by adjusting the screw speed of the extruder to 200 revolutions per minute and the kneaded mixture was extruded through a nozzle die with a diameter of 3 mm, after which the extruded bars were cooled by water and cut to 4 mm in length to obtain pellets.

(Spherical Glass Powder)

The hyaline of a spherical glass powder conforming to the present invention is a netlike formation constituted by one, two or more of $SiO_2$, $B_2O_3$ and $P_2O_3$. Examples meeting this condition include alkali glass, soluble glass and no-alkali glass. To create a spherical shape, glass fibers can be crushed into spherical particles to achieve a sharp average particle size distribution. If the spherical glass powder contains a large amount of alkali, the thermoplastic resin tends to become brittle. Accordingly, it is desirable to use soluble glass containing less alkali, while it is more desirable to use non-alkali glass containing no alkali.

The aforementioned spherical glass powder uses glass fibers with a diameter of 20 μm as an initial material. Since glass fibers have a constant diameter, crushed glass particles with a diameter of 20 μm and length of 10 to 30 μm can be obtained by crushing glass fibers in such a way that their length does not vary from the aforementioned diameter of 20 μm. These crushed glass particles are then sprayed into flames of 2500 to 3000° C. in temperature generated by an oxygen burner provided inside a furnace, after which water containing 0.1 percent by weight of γ-glycidyl oxypropyl methyl diethoxy silane is sprayed onto the atomized spheres from a water spray device provided below the furnace, and then the resulting glass powder is collected using a bag filter. The collected glass powder is constituted by spherical glass powder particles with an average particle size of 10 to 40 μm. By using as a material the aforementioned glass fibers with a diameter of 20 μm, spherical glass powder particles with an average particle size of 10 to 40 μm can be obtained. The obtained spherical glass powder was solid. The above silanation process implemented in an atomized state is hereinafter referred to as "Atomization Method."

The aforementioned spherical glass powder is constituted by spherical glass powder particles that have been silanated by the aforementioned atomization method. In other words, this spherical glass powder is characterized in that its surface is entirely covered by a silane compound.

Examples of this silane compound include those expressed by the formula below:

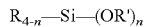

(In the formula, R indicates an organic group, R' indicates a methyl group, ethyl group or propyl group, and n is an integer selected from a range of 1 to 3.)

These silane compounds include vinyl triethoxy silane, vinyl trimethoxy silane, γ-methacryloyl oxypropyl trimethoxy silane, β-(3,4-epoxy cyclohexyl)ethyl trimethoxy silane, γ-glycidyl oxypropyl trimethoxy silane, γ-glycidyl oxypropyl methyl diethoxy silane and other silane-coupling agents containing an epoxy group; γ-mercapto propyl trimethoxy silane and other silane-coupling agents containing an mercapto group; γ-aminopropyl triethoxy silane, N-β-(aminoethyl)-γ-aminopropyl trimethoxy silane, N-β-(N-vinyl benzyl aminoethyl)-γ-aminopropyl trimethoxy silane and other silane-coupling agents containing an amino group.

Glass powders traditionally used have varying shapes such as polygon and rectangle, and their average particle size distributes over a wide range of 10 to 100 μm. Glass powders conforming to the present invention, on the other hand, have a spherical shape and their average particle size distributes over a very narrow range of 10 to 40 μm.

FIG. 2 is a graph showing the frequency distribution of average particle size of a spherical glass powder obtained by the production method of spherical glass powder explained above. The horizontal axis of this graph represents the particle size (μm) of the aforementioned spherical glass powder, while the vertical axis represents its frequency distribution (%). The aforementioned spherical E glass powder presents the maximum frequency distribution when its particle size is 25 μm, and draws a normal distribution curve covering 10 to 40 μm of particle sizes around this 25-μm point as the center, which indicates that particle sizes in this range occur frequently.

FIG. 3 is an electron microscope image of the aforementioned spherical powder taken at a magnification of 1,000 times. This image shows that the spherical glass powder is constituted by individual particles, each being solid, each having a spherical shape, and that these particles have different sizes from small to large.

From the graph showing the distribution frequency of average particle size of spherical E glass powder in FIG. 2, as well as this image shown in FIG. 3, it is clear that the spherical glass powder in the thermoplastic resin is constituted by particles having a circular shape and varying sizes from small to large, where the average particle size is 10 to 40 μm.

By the way, when the glass powder is introduced into the molten thermoplastic resin to be kneaded, the ratio of fine particles increases when the particle size of the powder becomes 10 μm or less, in which case the relative surface area will increase and thus the glass powder will take heat from the resin, and consequently the resin temperature will drop suddenly. As a result, the melt viscosity will rise and the resin temperature will rise excessively, during kneading, as a result of heat generation by shearing action. This will make it difficult to adjust the blending ratio of the two materials to the specified values. Also, blending a thermoplastic resin with a glass powder generally improves the dimensional stability, mechanical strength (impact strength, bending strength, etc.), warping property, transparent barrier property and other properties of the resulting molded product. However, use of a glass powder whose particle size is 10 μm or less is not desirable because some properties, especially bending strength, will drop.

When the aforementioned particle size becomes larger than 40 μm, the ratio of macro-particles increases. Although this will not cause the melt viscosity to rise much during kneading, the cutting blade will wear significantly when the glass-containing molding composition is cut into pellets of a specified size. Accordingly, it will become difficult to produce this glass-containing molding composition continuously by a large amount, thereby presenting production problems. Use of a glass powder whose particle size is 40 μm or more is not desirable because some properties, especially impact strength, will drop. In other words, a favorable range of average particle sizes is 10 to 40 μm.

(Thermoplastic Resin)

Thermoplastic resins include polyethylene (PE) resins, polypropylene (PP) resins, polyester resins, polystyrene (PS) resins, ABS resins, polyvinyl chloride (PVC) resins, polyamide resins, polycarbonate (PC) resins, and polylactic acid (PLA) resins. Polyester resins include PET, PEN, PBT and PTT, while polyamide resins include nylon resin (Ny) such as nylon 6, nylon 66, and etc.

If necessary, other resins may be used to provide barrier property or dimensional stability. Such other resins include methacrylic resins, polyimide resins, polyacetal resins, polymer alloy resins, and copolymer resins (EAA, EMAA, EEA, EMA and EMMA).

Thermoplastic resins can be blended with any pigment, titanium oxide, alumina, talc, mica, silica, magnesium carbonate and metal lame, in order to color and gloss to the thermoplastic resins.

Among thermoplastic resins, PE, PP, PET, PS, ABS, PVC or polycarbonate in a molten state is blended with a spherical glass powder by up to 70 percent by weight, and the mixture is kneaded and extruded into bars of 3 mm in diameter through the nozzle die provided at the outlet of the extruder, after which the bars are cooled by water and cut to a length of approx. 4 mm using a cutter to obtain a glass-containing molding composition in the form of pellets in which the spherical glass powder is independently dispersed in the thermoplastic resin. It should be noted, however, that the diameter and length are not at all limited to the aforementioned dimensions.

FIG. 4A is an electron microscope image of a glass-containing molding composition (pellet) produced by the aforementioned production method of glass-containing molding composition conforming to the present invention. This electronic microscope image provides a ×50 view of the cut surface of a pellet that has been cut vertically from side, where the pellet was obtained by blending 50 percent by weight of spherical E glass powder with PP.

FIG. 4B is an electron microscope image showing a ×100 view of the aforementioned cut surface.

FIG. 4C is an electron microscope image showing a ×100 view of the side face of the aforementioned pellet.

From the image of the cut surface of the pellet shown in FIG. 4B, it is clear that in this pellet individual spherical glass powder particles are independently dispersed in the PP without aggregating together.

This reveals that by covering the entire surface of the aforementioned spherical glass powder with a silane compound according to the atomization method, the aforementioned pellet formed through kneading and extrusion using the extruder ensures that the spherical glass powder particles are independently dispersed in the resin without aggregating together.

Next, a circle was drawn around the center of the image in FIG. 4A by covering the top and bottom positions, and this circle was divided equally to 16 sections to visually count the number of spherical glass powder particles blended in each of the 16 sections. The counting results are shown in Table 1.

In the above, when calculating the number of spherical glass powder particles, those spherical glass powder particles existing on the lines dividing the 16 sections were counted as one half

TABLE 1

| | Section | | | | | | | | | | | | | | | |
|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 |
| Number of glass particles | 140 | 141 | 139 | 140 | 139 | 141 | 140 | 139 | 140 | 140 | 141 | 140 | 140 | 139 | 140 | 141 |

The measured results in Table 1 show that, because the number of spherical glass powder particles in each section is in a range of 140±1, the spherical glass powder particles are dispersed uniformly in the pellet.

From the above, it is found that the glass-containing molding composition conforming to the present invention, which is produced by kneading a glass powder and a thermoplastic resin and then extruding the kneaded mixture using an extruder, is constituted by glass powder particles being solid, having a spherical shape, and of an average particle size of 10 to 40 µm, wherein its surface is totally covered with silane compound, and the glass-containing molding composition is independently and uniformly dispersed in the thermoplastic resin as a glass load ratio in a range of 40 to 70 percent by weight.

The image in FIG. 4C shows the side face of the pellet is covered by spherical convex shapes and the spherical convex shapes cover the spherical glass powder with the thermoplastic resin.

EXAMPLES AND COMPARATIVE EXAMPLES

The Examples explained below each pertain to one of nine types of pelletized thermoplastic resins (PE, PP, PET, PS, ABS, PVC, PC, PLA or Ny), and use spherical E glass powder silanated according to the aforementioned atomization method, with one of nine types of the pelletized resin and powder blended at one of the four blending ratios by weight of 40:60, 50:50, 60:40, and 70:30. The flowability at each blending ratio by weight, the details of which is explained later, is indicated by a melt flow rate (the melt flow rate is hereinafter referred to as "MFR").

The aforementioned MFR is a yardstick of flowability of molten polymer and provides an index, in units of g/10 min, representing the amount flowing out from a nozzle (orifice) of specified dimensions at a specified pressure and specified temperature as measured on a push-type plastometer. In general, the greater the MFR value, the more favorable the flowability and processability of the molten resin become. This MFR is used as a global indicator for flow rate condition of resin.

The MFR of the above nine types of thermoplastic resins are, PE (HD-PE) which is chosen as examples is 0.25 and ABS is 30.0 that MFR of those thermoplastic resins is in range of 0.25 to 30.0. Even though they are same thermoplastic resins, however, the MFR differs according to their molecular weight. The aforementioned nine types of the thermoplastic resins have been selected as MFR of other thermoplastic resins and/or thermoplastic resins having different molecular weight are in range of MFR 0.25 to 30.0.

The comparative sphere used in Comparative Examples 1 and 2, which is the same spherical glass powder used in Examples, was made by silanating, via the soak method, crushed E glass fibers that had been crushed into a spherical shape. While the spherical glass powder used in Examples was silanated using the atomization method, the spherical glass powder used in Comparative Examples 1 and 2 was silanated using the soak method, and because of this difference the spherical glass powder used in Comparative Examples 1 and 2 is referred to as "Comparative Sphere."

The aforementioned soak method used in Comparative Examples 1 and 2 is to soak for 30 minutes under agitation a spherical glass powder in an aqueous solution containing 0.1 percent by weight of γ-glycidyl oxypropyl methyl diethoxy silane, and then filter the mixture and dry the filtrate at 100° C. This process causes multiple spherical glass powder particles to contact with one another and become coated with a silane compound, with the particles consequently filtered and dried to produce aggregated spherical glass powder particles among silanated glass powder particles (hereinafter referred to as "Aggregated Spherical Glass Powder Particles").

In the above, the Comparative Examples did not use a conventional glass powder containing various shapes of particles for the purpose of comparison with the Examples, because when an attempt was made to introduce HD-PE pellets, and 40 percent by weight of a conventional glass powder containing various shapes of particles, into the first hopper for kneading, the flowability dropped rapidly and the frictional resistance relative to the screw increased to or above the shearing force of the screw. As a result, the composition could not be produced in fear of potential damage to the screw threads, etc., and therefore it was found that if this powder was used, experimental data for comparison with the Examples could not be obtained to clarify the effect of introducing glass powder into molten thermoplastic resin, as well as the effect of non-aggregated glass powder particles. For this reason, a spherical powder produced by crushing and spheroidizing E glass fibers was used. By using this powder, experimental data were able to be obtained to clarify the effect of introducing glass powder into molten thermoplastic resin, as well as the effect of non-aggregated glass powder particles.

In Comparative Example 1, one of the nine types of resins and the comparative sphere were weighed and introduced separately into the extruder. To be specific, pellets of the resin were introduced to the first hopper, while the comparative sphere was introduced to the second hopper. The blending ratio by weight of the comparative sphere and resin pellets was adjusted to one of the three levels of 20:80, 30:70 and 40:60, and the experimental data showing the MFR at respective contents by weight are shown in Tables 4, 6, 8, 10, 12, 14, 16, 18 and 20 below.

In Comparative Example 2, pellets of one resin and the comparative sphere were blended and introduced simultaneously to the first hopper. The blending ratio by weight of the comparative sphere and resin pellets was adjusted to one of the three levels of 20:80, 30:70 and 40:60, and the experimental data showing the MFR at respective contents by weight are shown in Tables 4, 6, 8, 10, 12, 14, 16, 18 and 20 below.

Table 2 shows the conditions used to obtain three types of molding compositions under the Examples and Comparative Examples 1 and 2, or specifically the six items including glass particle, method of silanation process, type of resin, glass load ratio, material introduced to the first hopper, and material introduced to the second hopper (these six items are hereinafter referred to as "Six Conditions").

For your information, the aforementioned term "glass load ratio" is defined as the percentage by weight of the spherical glass powder relative to the total weight of the spherical glass powder and the thermoplastic resin. The term "glass load ratio" is sometimes used instead of "percent glass load ratio by weight," but the two terms have the same meaning.

TABLE 2

|  | Glass particle | Silanation process | Resin | Glass load ratio | First hopper | Second hopper |
|---|---|---|---|---|---|---|
| Example | Spherical E glass powder | Atomization method | Each resin | 40, 50, 60, 70 | Each resin | Spherical E glass powder |
| Comparative Example 1 | Comparative sphere | Soak method | Each resin | 20, 30, 40 | Each resin | Comparative sphere |
| Comparative Example 2 | Comparative sphere | Soak method | Each resin | 20, 30, 40 | Each resin & comparative sphere | — |

By the way, to examine the characteristics the glass-containing molding composition obtained in each Example had compared to the comparative spherical molding compositions obtained in Comparative Examples 1 and 2, the molding composition was melted at the same temperature as the melting temperature at which each resin used in the production under the above six conditions was melted, in order to measure the MFR of the molding composition for each resin. By measuring the MFR of the molding composition at the same temperature as the melting temperature at which each of the aforementioned resins was melted, the condition of flowability when the glass powder is introduced to the molding extruder in a region where the resin is in a molten state can be indicated numerically. And by comparing this MFR against the MFR of the comparative spherical molding compositions obtained in Comparative Examples 1 and 2, the MFR characteristics of the glass-containing molding composition obtained in the Example can be clarified.

The measured results are shown in Examples 1 to 9 below.

Example 1

In Example 1, PE (HD-PE) was used as a thermoplastic resin, and the spherical E glass powder silanated by the atomization method was blended with the PE at one of the four blending ratios by weight of 40:60, 50:50, 60:40, and 70:30.

HD-PE (high-density polyethylene) constituted by HI-ZEX 5100B (product name; manufactured by Prime Polymer Co., Ltd.) was weighed and 60 percent by weight of it was introduced from the first hopper of the aforementioned extruder, and after the resin was melted at 230° C., the spherical E glass powder specified above as the glass particle used in Examples was weighed and 40 percent by weight of it was preheated to a temperature equal or close to the resin melting temperature of 230° C. and introduced from the second hopper, after which the mixture was kneaded at a temperature of 230° C. with a screw speed of 200 revolutions per minute and then extruded into bars of 3 mm in diameter, which were cooled by water and then cut to a length of 4 mm to obtain pellets. This represents a Level 1 molding composition obtained in Example 1. The preheating temperature should most preferably be identical to the melting temperature of 230° C. (in a range of 230° C.±10%).

Similarly, a Level 2 molding composition was obtained from 50 percent by weight of HI-ZEX 5100B and 50 percent by weight of spherical E glass powder, and a Level 3 molding composition was obtained from 30 percent by weight of HI-ZEX 5100B and 70 percent by weight of spherical E glass powder.

Comparative Example 1-1

The PE and comparative sphere were weighed and introduced separately into the extruder. Specifically, the PE pellets were introduced to the first hopper, while the comparative sphere was introduced to the second hopper. The blending ratio by weight of the comparative sphere and PE pellets was adjusted to one of the three levels of 20:80, 30:70 and 40:60. A HD-PE constituted by HI-ZEX 5100B (product name; manufactured by Prime Polymer Co., Ltd.) was used. The materials were kneaded in the extruder at a temperature of 230° C. with a screw speed of 200 revolutions per minute and then extruded into bars of 3 mm in diameter, which were cooled by water and then cut to a length of 4 mm to obtain pellets. The comparative sphere introduced to the second hopper was not preheated.

Comparative Example 1-2

The PE pellets and comparative sphere were blended and introduced simultaneously to the first hopper, where the blending ratio by weight of the comparative sphere and PE pellets was adjusted to one of the three levels of 20:80, 30:70 and 40:60. A HD-PE constituted by HI-ZEX 5100B (product name; manufactured by Prime Polymer Co., Ltd.) was used. The materials were kneaded in the extruder at a temperature of 230° C. with a screw speed of 200 revolutions per minute and then extruded into bars of 3 mm in diameter, which were cooled by water and then cut to a length of 4 mm to obtain pellets.

For the Comparative Example 1-1, first number 1 stands for PE and the second number 1 stands for the above Comparative Example 1. In the same manner, for the Comparative Example 1-2, first number 1 stands for PE and the second number 2 stands for the above Comparative Example 2. Each numbers in the after-mentioned Comparative Example 2-1, Comparative Example 2-2 to Comparative Example 9-1, and Comparative Example 9-2 stand for as same as described above.

Table 3 shows the aforementioned six conditions used to obtain the molding compositions in Example 1 and Comparative Examples 1-1 and 1-2 explained above. Tables 1 and 3 shown above list the same items except that among the six conditions, "PE" is specified in the "Resin" and "First hopper" fields in Table 3 according to the applicable resin.

In the above, the condition tables for the remaining eight types of thermoplastic resins (PP, PET, PS, ABS, PVC, PC, PLA and Ny) also list the same items except that among the aforementioned six conditions, the applicable resin is specified in the "Resin" and "First hopper" fields in each table. Accordingly, a table of six conditions is not provided for each of the aforementioned eight types of thermoplastic resins.

TABLE 3

| | Glass particle | Silanation process | Resin | Glass load ratio | First hopper | Second hopper |
|---|---|---|---|---|---|---|
| Example 1 | Spherical E glass powder | Atomization method | PE | 40, 50, 60, 70 | PE | Spherical E glass powder |
| Comparative Example 1-1 | Comparative sphere | Soak method | PE | 20, 30, 40 | PE | Comparative sphere |
| Comparative Example 1-2 | Comparative sphere | Soak method | PE | 20, 30, 40 | PE & comparative sphere | — |

Table 4 shows the MFR, measured at 230° C., of the aforementioned pellets at each glass load ratio.

In the above, in Table 4 the MFR of the HD-PE (HI-ZEX 5100B) used in Example 1 was 0.25 when the thermoplastic resin load was 100 percent by weight.

TABLE 4

| | 0% | 20% | 30% | 40% | 50% | 60% | 70% |
|---|---|---|---|---|---|---|---|
| HD-PE | 0.25 | | | | | | |
| Example 1 | 0.25 | | | 0.18 | 0.15 | 0.12 | 0.07 |
| Comparative Example 1-1 | 0.25 | 0.19 | 0.15 | 0.10 | | | |
| Comparative Example 1-2 | 0.25 | 0.16 | 0.09 | 0.005 | | | |

FIG. 5 is a graph showing quadratic polynomial curves to approximate the relationships of glass load ratio and MFR, created based on the glass load ratio (percent by weight) and MFR data shown in Table 4.

In this graph, □ indicates the MFR for Example 1, Δ indicates the MFR for Comparative Example 1-1, and X indicates the MFR for Comparative Example 1-2. These MFR curves for Example 1, Comparative Example 1-1 and Comparative Example 1-2 show the trend of drop in each MFR when the load of glass powder was increased from 0.25 corresponding to the MFR of 100% thermoplastic resin (hereinafter referred to as "100% MFR"). Also to indicate the glass load ratio corresponding to 0.125, or one half the 100% MFR (0.25) of the HD-PE (hereinafter referred to as "1/2 MFR"), a vertical line was drawn to the X-axis from the intersection of the line of 1/2 MFR and each curve.

The reason for obtaining the glass load ratio of 1/2 MFR will be described below in the description of Table 23.

Table 5 shows the glass load ratios corresponding to the aforementioned 1/2 MFR for Comparative Example 1-2, Comparative Example 1-1 and Example 1.

TABLE 5

| | Comparative Example 1-2 (% by weight) | Comparative Example 1-1 (% by weight) | Example 1 (% by weight) |
|---|---|---|---|
| HD-PE | 26 | 36 | 57 |

In Example 1, a 200-ml bottle was able to be formed by direct blow molding using a glass-containing molding composition containing glass not only by 50 percent by weight, but also by 70 percent by weight.

Example 2

In Example 2, PP was used as a thermoplastic resin, and the spherical E glass powder silanated by the atomization method was blended with the PP at one of the four blending ratios by weight of 40:60, 50:50, 60:40, and 70:30.

A PP constituted by Novatec-PP MA3 (product name; manufactured by Japan Polypropylene Corporation) was weighed and 60 percent by weight of it was introduced from the first hopper of the aforementioned extruder, and after the resin was melted at 220° C., the spherical E glass powder specified above as the glass particle used in Examples was weighed and 40 percent by weight of it was preheated to a temperature equal or close to the resin melting temperature of 220° C. and introduced from the second hopper, after which the mixture was kneaded at a temperature of 220° C. with a screw speed of 200 revolutions per minute and then extruded into bars of 3 mm in diameter, which were cooled by water and then cut to a length of 4 mm to obtain pellets. This represents a Level 1 molding composition obtained in Example 2. The preheating temperature should most preferably be identical to the melting temperature of 220° C. (in a range of 220° C.±10%).

Similarly, a Level 2 molding composition was obtained from 50 percent by weight of Novatec-PP MA3 and 50 percent by weight of spherical E glass powder, and a Level 3 molding composition was obtained from 30 percent by weight of Novatec-PP MA3 and 70 percent by weight of spherical E glass powder.

Comparative Example 2-1

The PP and comparative sphere were weighed and introduced separately into the extruder. Specifically, the PP pellets were introduced to the first hopper, while the comparative sphere was introduced to the second hopper. The blending ratio by weight of the comparative sphere and PP pellets was adjusted to one of the three levels of 20:80, 30:70 and 40:60. A PP constituted by Novatec-PP MA3 was used. The materials were kneaded in the extruder at a temperature of 220° C. with a screw speed of 200 revolutions per minute and then extruded into bars of 3 mm in diameter, which were cooled by water and then cut to a length of 4 mm to obtain pellets. The comparative sphere introduced to the second hopper was not preheated.

Comparative Example 2-2

The PP pellets and comparative sphere were blended and introduced simultaneously to the first hopper, where the blending ratio by weight of the comparative sphere and PP pellets was adjusted to one of the three levels of 20:80, 30:70 and 40:60. A PP constituted by Novatec-PP MA3 was used. The materials were kneaded in the extruder at a temperature of 220° C. with a screw speed of 200 revolutions per minute and then extruded into bars of 3 mm in diameter, which were cooled by water and then cut to a length of 4 mm to obtain pellets.

Table 6 shows the MFR, measured at 220° C., of the aforementioned PE pellets at each glass load ratio.

In the above, in Table 6 the MFR of the PP (Novatec-PP MA3) used in Example 2 was 10.0 when the thermoplastic resin load was 100 percent by weight.

TABLE 6

|  | 0% | 20% | 30% | 40% | 50% | 60% | 70% |
|---|---|---|---|---|---|---|---|
| PP | 10.0 | | | | | | |
| Example 2 | 10.0 | | | 7.0 | 5.6 | 4.0 | 2.0 |
| Comparative Example 2-1 | 10.0 | 7.4 | 5.8 | 3.4 | | | |
| Comparative Example 2-2 | 10.0 | 6.3 | 4.0 | 1.6 | | | |

FIG. 6 is a graph showing quadratic polynomial curves to approximate the relationships of glass load ratio and MFR, created based on the glass load ratio (percent by weight) and MFR data shown in Table 6.

In this graph, □ indicates the MFR for Example 2, Δ indicates the MFR for Comparative Example 2-1, and X indicates the MFR for Comparative Example 2-2. These MFR curves for Example 2, Comparative Example 2-1 and Comparative Example 2-2 show the trend of drop in each MFR when the load of glass powder was increased from 10.0 corresponding to the 100% MFR. Also to indicate the glass load ratio corresponding to 5.0, or one half the 100% MFR (10.0) of the PP (=1/2 MFR), a vertical line was drawn to the X-axis from the intersection of the line of 1/2 MFR and each curve.

Table 7 shows the glass load ratios corresponding to the aforementioned 1/2 MFR for Comparative Example 2-2, Comparative Example 2-1 and Example 2.

TABLE 7

|  | Comparative Example 2-2 (% by weight) | Comparative Example 2-1 (% by weight) | Example 2 (% by weight) |
|---|---|---|---|
| PP | 26 | 32 | 54 |

In Example 2, a piece of tableware was able to be formed by injection molding using a glass-containing molding composition containing glass not only by 50 percent by weight, but also by 70 percent by weight.

Example 3

In Example 3, PET was used as a thermoplastic resin, and the spherical E glass powder silanated by the atomization method was blended with the PET at one of the four blending ratios by weight of 40:60, 50:50, 60:40, and 70:30.

A PET constituted by Vylon FN305 (product name; manufactured by Toyobo Co., Ltd.) was weighed and 60 percent by weight of it was introduced from the first hopper of the aforementioned extruder, and after the resin was melted at 250° C., the spherical E glass powder specified above as the glass particle used in Examples was weighed and 40 percent by weight of it was preheated to a temperature equal or close to the resin melting temperature of 250° C. and introduced from the second hopper, after which the mixture was kneaded at a temperature of 250° C. with a screw speed of 200 revolutions per minute and then extruded into bars of 3 mm in diameter, which were cooled by water and then cut to a length of 4 mm to obtain pellets. This represents a Level 1 molding composition obtained in Example 3. The preheating temperature should most preferably be identical to the melting temperature of 250° C. (in a range of 250° C.±10%).

Similarly, a Level 2 molding composition was obtained from 50 percent by weight of Vylon FN305 and 50 percent by weight of spherical E glass powder, and a Level 3 molding composition was obtained from 30 percent by weight of Vylon FN305 PP MA3 and 70 percent by weight of spherical E glass powder.

Comparative Example 3-1

The PET and comparative sphere were weighed and introduced separately into the extruder. Specifically, the PET pellets were introduced to the first hopper, while the comparative sphere was introduced to the second hopper. The blending ratio by weight of the comparative sphere and PET pellets was adjusted to one of the three levels of 20:80, 30:70 and 40:60. A PET constituted by Vylon FN 305 was used. The materials were kneaded in the extruder at a temperature of 250° C. with a screw speed of 200 revolutions per minute and then extruded into bars of 3 mm in diameter, which were cooled by water and then cut to a length of 4 mm to obtain pellets. The comparative sphere introduced to the second hopper was not preheated.

Comparative Example 3-2

The PET pellets and comparative sphere were blended and introduced simultaneously to the first hopper, where the blending ratio by weight of the comparative sphere and PET pellets was adjusted to one of the three levels of 20:80, 30:70 and 40:60. A PET constituted by Vylon FN305 was used. The materials were kneaded in the extruder at a temperature of 250° C. with a screw speed of 200 revolutions per minute and then extruded into bars of 3 mm in diameter, which were cooled by water and then cut to a length of 4 mm to obtain pellets.

Table 8 shows the MFR, measured at 250°, of the aforementioned pellets at each glass load ratio.

In the above, in Table 8 the MFR of Vylon FN305 used in Example 3 was 20.0 when the thermoplastic resin load was 100 percent by weight.

TABLE 8

|  | 0% | 20% | 30% | 40% | 50% | 60% | 70% |
|---|---|---|---|---|---|---|---|
| PET | 20.0 | | | | | | |
| Example 3 | 20.0 | | | 15.0 | 12.3 | 8.0 | 5.0 |
| Comparative Example 3-1 | 20.0 | 14.9 | 12.0 | 6.0 | | | |

TABLE 8-continued

|  | 0% | 20% | 30% | 40% | 50% | 60% | 70% |
|---|---|---|---|---|---|---|---|
| Comparative Example 3-2 | 20.0 | 12.4 | 7.4 | 1.5 | | | |

FIG. 7 is a graph showing quadratic polynomial curves to approximate the relationships of glass load ratio and MFR, created based on the glass load ratio (percent by weight) and MFR data shown in Table 8.

In this graph, □ indicates the MFR for Example 3, Δ indicates the MFR for Comparative Example 3-1, and X indicates the MFR for Comparative Example 3-2. These MFR curves for Example 3, Comparative Example 3-1 and Comparative Example 3-2 show the trend of drop in each MFR when the load of glass powder was increased from 20.0 corresponding to the 100% MFR. Also to indicate the glass load ratio corresponding to 10.0, or one half the 100% MFR (20.0) of the PET (=1/2 MFR), a vertical line was drawn to the X-axis from the intersection of the line of 1/2 MFR and each curve.

Table 9 shows the glass load ratios corresponding to the aforementioned 1/2 MFR for Comparative Example 3-2, Comparative Example 3-1 and Example 3.

TABLE 9

|  | Comparative Example 3-2 (% by weight) | Comparative Example 3-1 (% by weight) | Example 3 (% by weight) |
|---|---|---|---|
| PET | 25 | 32 | 57 |

In Example 3, a 300-ml bottle was able to be formed by the hot parison method for injection blow molding using a glass-containing molding composition containing glass not only by 50 percent by weight, but also by 70 percent by weight.

Example 4

In Example 4, PS was used as a thermoplastic resin, and the spherical E glass powder silanated by the atomization method was blended with the PS at one of the four blending ratios by weight of 40:60, 50:50, 60:40, and 70:30.

A PS constituted by GPPS HF77 (product name; manufactured by PS Japan Co., Ltd.) was weighed and 60 percent by weight of it was introduced from the first hopper of the aforementioned extruder, and after the resin was melted at 190° C., the spherical E glass powder specified above as the glass particle used in Examples was weighed and 40 percent by weight of it was preheated to a temperature equal or close to the resin melting temperature of 190° C. and introduced from the second hopper, after which the mixture was kneaded at a temperature of 190° C. with a screw speed of 200 revolutions per minute and then extruded into bars of 3 mm in diameter, which were cooled by water and then cut to a length of 4 mm to obtain pellets. This represents a Level 1 molding composition obtained in Example 4. The preheating temperature should most preferably be identical to the melting temperature of 190° C. (in a range of 190° C.±10%)

Similarly, a Level 2 molding composition was obtained from 50 percent by weight of GPPS HF77 and 50 percent by weight of spherical E glass powder, and a Level 3 molding composition was obtained from 30 percent by weight of GPPS HF77 and 70 percent by weight of spherical E glass powder.

Comparative Example 4-1

The PS and comparative sphere were weighed and introduced separately into the extruder. Specifically, the PS pellets were introduced to the first hopper, while the comparative sphere was introduced to the second hopper. The blending ratio by weight of the comparative sphere and PS pellets was adjusted to one of the three levels of 20:80, 30:70 and 40:60. A PS constituted by GPPS HF77 was used. The materials were kneaded in the extruder at a temperature of 190° C. with a screw speed of 200 revolutions per minute and then extruded into bars of 3 mm in diameter, which were cooled by water and then cut to a length of 4 mm to obtain pellets. The comparative sphere introduced to the second hopper was not preheated.

Comparative Example 4-2

The PS pellets and comparative sphere were blended and introduced simultaneously to the first hopper, where the blending ratio by weight of the comparative sphere and PS pellets was adjusted to one of the three levels of 20:80, 30:70 and 40:60. A PS constituted by GPPS HF77 was used. The materials were kneaded in the extruder at a temperature of 190° C. with a screw speed of 200 revolutions per minute and then extruded into bars of 3 mm in diameter, which were cooled by water and then cut to a length of 4 mm to obtain pellets.

Table 10 shows the MFR, measured at 190° C., of the aforementioned pellets at each glass load ratio.

In the above, in Table 10 the MFR of GPPS HF77 used in Example 4 was 7.5 when the thermoplastic resin load was 100 percent by weight.

TABLE 10

|  | 0% | 20% | 30% | 40% | 50% | 60% | 70% |
|---|---|---|---|---|---|---|---|
| PS | 7.5 | | | | | | |
| Example 4 | 7.5 | | | 4.9 | 3.9 | 2.8 | 2.0 |
| Comparative Example 4-1 | 7.5 | 5.5 | 4.1 | 2.50 | | | |
| Comparative Example 4-2 | 7.5 | 4.5 | 3.0 | 0.8 | | | |

FIG. 8 is a graph showing quadratic polynomial curves to approximate the relationships of glass load ratio and MFR, created based on the glass load ratio (percent by weight) and MFR data shown in Table 10.

In this graph, □ indicates the MFR for Example 4, Δ indicates the MFR for Comparative Example 4-1, and X indicates the MFR for Comparative Example 4-2. These MFR curves for Example 4, Comparative Example 4-1 and Comparative Example 4-2 show the trend of drop in each MFR when the load of glass powder was increased from 7.5 corresponding to the 100% MFR. Also to indicate the glass load ratio corresponding to 3.8 or one half the 100% MFR (7.5) of the PS (=1/2 MFR), a vertical line was drawn to the X-axis from the intersection of the line of 1/2 MFR and each curve.

Table 11 shows the glass load ratios corresponding to the aforementioned 1/2 MFR for Comparative Example 4-2, Comparative Example 4-1 and Example 4.

TABLE 11

|  | Comparative Example 4-2 (% by weight) | Comparative Example 4-1 (% by weight) | Example 4 (% by weight) |
|---|---|---|---|
| PS | 25 | 32 | 53 |

In Example 4, a food tray was able to be formed by thermal press molding of a sheet that had been molded with a T-die using a glass-containing molding composition containing glass not only by 50 percent by weight, but also by 70 percent by weight.

Example 5

In Example 5, ABS was used as a thermoplastic resin, and the spherical E glass powder silanated by the atomization method was blended with the ABS at one of the four blending ratios by weight of 40:60, 50:50, 60:40, and 70:30.

An ABS constituted by Santac UT-61 (product name; manufactured by Nippon A&L Inc.) was weighed and 60 percent by weight of it was introduced from the first hopper of the aforementioned extruder, and after the resin was melted at 220° C., the spherical E glass powder specified above as the glass particle used in Examples was weighed and 40 percent by weight of it was preheated to a temperature equal or close to the resin melting temperature of 220° C. and introduced from the second hopper, after which the mixture was kneaded at a temperature of 220° C. with a screw speed of 200 revolutions per minute and then extruded into bars of 3 mm in diameter, which were cooled by water and then cut to a length of 4 mm to obtain pellets. This represents a Level 1 molding composition obtained in Example 5. The preheating temperature should most preferably be identical to the melting temperature of 220° C. (in a range of 220° C.±10%).

Similarly, a Level 2 molding composition was obtained from 50 percent by weight of Santac UT-61 and 50 percent by weight of spherical E glass powder, and a Level 3 molding composition was obtained from 30 percent by weight of Santac UT-61 and 70 percent by weight of spherical E glass powder.

Comparative Example 5-1

The ABS and comparative sphere were weighed and introduced separately into the extruder. Specifically, the ABS pellets were introduced to the first hopper, while the comparative sphere was introduced to the second hopper. The blending ratio by weight of the comparative sphere and ABS pellets was adjusted to one of the three levels of 20:80, 30:70 and 40:60. An ABS constituted by Santac UT-61 was used. The materials were kneaded in the extruder at a temperature of 220° C. with a screw speed of 200 revolutions per minute and then extruded into bars of 3 mm in diameter, which were cooled by water and then cut to a length of 4 mm to obtain pellets. The comparative sphere introduced to the second hopper was not preheated.

Comparative Example 5-2

The ABS pellets and comparative sphere were blended and introduced simultaneously to the first hopper, where the blending ratio by weight of the comparative sphere and ABS pellets was adjusted to one of the three levels of 20:80, 30:70 and 40:60. An ABS constituted by Santac UT-61 was used. The materials were kneaded in the extruder at a temperature of 220° C. with a screw speed of 200 revolutions per minute and then extruded into bars of 3 mm in diameter, which were cooled by water and then cut to a length of 4 mm to obtain pellets.

Table 12 shows the MFR, measured at 220° C., of the aforementioned pellets at each glass load ratio.

In the above, in Table 12 the MFR of Santac UT-61 used in Example 5 was 30.0 when the thermoplastic resin load was 100 percent by weight.

TABLE 12

|  | 0% | 20% | 30% | 40% | 50% | 60% | 70% |
|---|---|---|---|---|---|---|---|
| ABS | 30.0 | | | | | | |
| Example 5 | 30.0 | | | 22.0 | 16.7 | 10.0 | 3.4 |
| Comparative Example 5-1 | 30.0 | 24.0 | 17.5 | 9.0 | | | |
| Comparative Example 5-2 | 30.0 | 21.0 | 13.8 | 4.0 | | | |

FIG. 9 is a graph showing quadratic polynomial curves to approximate the relationships of glass load ratio and MFR, created based on the glass load ratio (percent by weight) and MFR data shown in Table 12.

In this graph, □ indicates the MFR for Example 5, Δ indicates the MFR for Comparative Example 5-1, and X indicates the MFR for Comparative Example 5-2. These MFR curves for Example 5 Comparative Example 5-1 and Comparative Example 5-2 show the trend of drop in each MFR when the load of glass powder was increased from 30.0 corresponding to the 100% MFR. Also to indicate the glass load ratio corresponding to 15.0 or one half the 100% MFR (30.0) of the ABS (=1/2 MFR), a vertical line was drawn to the X-axis from the intersection of the line of 1/2 MFR and each curve.

Table 13 shows the glass load ratios corresponding to the aforementioned 1/2 MFR for Comparative Example 5-2, Comparative Example 5-1 and Example 5.

TABLE 13

|  | Comparative Example 5-2 (% by weight) | Comparative Example 5-1 (% by weight) | Example 5 (% by weight) |
|---|---|---|---|
| ABS | 28 | 33 | 53 |

In Example 5, a toilet seat was able to be formed by injection molding using a glass-containing molding composition containing glass not only by 50 percent by weight, but also by 70 percent by weight.

Example 6

In Example 6, PVC was used as a thermoplastic resin, and the spherical E glass powder silanated by the atomization method was blended with the PVC at one of the four blending ratios by weight of 40:60, 50:50, 60:40, and 70:30.

A PVC constituted by Trinity ANA 9930T (product name; manufactured by Riken Technos Corp.) was weighed and 60 percent by weight of it was introduced from the first hopper of the aforementioned extruder, and after the resin was melted at 230° C., the spherical E glass powder specified above as the glass particle used in Examples was weighed and 40 percent by weight of it was preheated to a temperature equal or close to the resin melting temperature of 230° C. and introduced from the second hopper, after which the mixture was kneaded at a temperature of 230° C. with a screw speed of 200 revolutions per minute and then extruded into bars of 3 mm in diameter, which were cooled by water and then cut to a length of 4 mm to obtain pellets. This represents a Level 1 molding composition obtained in Example 6. The preheating temperature should most preferably be identical to the melting temperature of 230° C. (in a range of 230° C.±10%).

Similarly, a Level 2 molding composition was obtained from 50 percent by weight of Trinity ANA 9930T and 50 percent by weight of spherical E glass powder, and a Level 3 molding composition was obtained from 30 percent by weight of Trinity ANA 9930T and 70 percent by weight of spherical E glass powder.

Comparative Example 6-1

The PVC and comparative sphere were weighed and introduced separately into the extruder. Specifically, the PVC pellets were introduced to the first hopper, while the comparative sphere was introduced to the second hopper. The blending ratio by weight of the comparative sphere and PVC pellets was adjusted to one of the three levels of 20:80, 30:70 and 40:60. A PVC constituted by Trinity ANA 9930T was used. The materials were kneaded in the extruder at a temperature of 230° C. with a screw speed of 200 revolutions per minute and then extruded into bars of 3 mm in diameter, which were cooled by water and then cut to a length of 4 mm to obtain pellets. The comparative sphere introduced to the second hopper was not preheated.

Comparative Example 6-2

The PVC pellets and comparative sphere were blended and introduced simultaneously to the first hopper, where the blending ratio by weight of the comparative sphere and PVC pellets was adjusted to one of the three levels of 20:80, 30:70 and 40:60. A PVC constituted by Trinity ANA 9930T was used. The materials were kneaded in the extruder at a temperature of 230° C. with a screw speed of 200 revolutions per minute and then extruded into bars of 3 mm in diameter, which were cooled by water and then cut to a length of 4 mm to obtain pellets.

Table 14 shows the MFR, measured at 230° C., of the aforementioned pellets at each glass load ratio.

In the above, in Table 14 the MFR of Trinity ANA 9930T used in Example 6 was 3.4 when the thermoplastic resin load was 100 percent by weight.

TABLE 14

|  | 0% | 20% | 30% | 40% | 50% | 60% | 70% |
| --- | --- | --- | --- | --- | --- | --- | --- |
| PVC | 3.4 | | | | | | |
| Example 6 | 3.4 | | | 2.5 | 1.9 | 1.2 | 0.6 |
| Comparative Example 6-1 | 3.4 | 2.4 | 1.8 | 0.9 | | | |
| Comparative Example 6-2 | 3.4 | 2.1 | 1.2 | 0.30 | | | |

FIG. 10 is a graph showing quadratic polynomial curves to approximate the relationships of glass load ratio and MFR, created based on the glass load ratio (percent by weight) and MFR data shown in Table 14.

In this graph, □ indicates the MFR for Example 6, Δ indicates the MFR for Comparative Example 6-1, and X indicates the MFR for Comparative Example 6-2. These MFR curves for Example 6 Comparative Example 6-1 and Comparative Example 6-2 show the trend of drop in each MFR when the load of glass powder was increased from 3.4 corresponding to the 100% MFR. Also to indicate the glass load ratio corresponding to 1.7 or one half the 100% MFR (3.4) of the PVC (=1/2 MFR), a vertical line was drawn to the X-axis from the intersection of the line of 1/2 MFR and each curve.

Table 15 shows the glass load ratios corresponding to the aforementioned 1/2 MFR for Comparative Example 6-2, Comparative Example 6-1 and Example 6.

TABLE 15

|  | Comparative Example 6-2 (% by weight) | Comparative Example 6-1 (% by weight) | Example 6 (% by weight) |
| --- | --- | --- | --- |
| PVC | 25 | 31 | 53 |

In Example 6, a sheet was able to be extrusion-molded with a T-die using a glass-containing molding composition containing glass not only by 50 percent by weight, but also by 70 percent by weight.

Example 7

In Example 7, PC was used as a thermoplastic resin, and the spherical E glass powder silanated by the atomization method was blended with the PC at one of the four blending ratios by weight of 40:60, 50:50, 60:40, and 70:30.

A PC constituted by Calibre 351-6 (product name; manufactured by Sumitomo Dow Limited.) was weighed and 60 percent by weight of it was introduced from the first hopper of the aforementioned extruder, and after the resin was melted at 300° C., the spherical E glass powder specified above as the glass particle used in Examples was weighed and 40 percent by weight of it was preheated to a temperature equal or close to the resin melting temperature of 300° C. and introduced from the second hopper, after which the mixture was kneaded at a temperature of 300° C. with a screw speed of 200 revolutions per minute and then extruded into bars of 3 mm in diameter, which were cooled by water and then cut to a length of 4 mm to obtain pellets. This represents a Level 1 molding composition obtained in Example 7. The preheating temperature should most preferably be identical to the melting temperature of 300° C. (in a range of 300° C.±10%).

Similarly, a Level 2 molding composition was obtained from 50 percent by weight of Calibre 351-6 and 50 percent by weight of spherical E glass powder, and a Level 3 molding composition was obtained from 30 percent by weight of Calibre 351-6 and 70 percent by weight of spherical E glass powder.

Comparative Example 7-1

The PC and comparative sphere were weighed and introduced separately into the extruder. Specifically, the PC pellets were introduced to the first hopper, while the comparative sphere was introduced to the second hopper. The blending ratio by weight of the comparative sphere and PC pellets was adjusted to one of the three levels of 20:80, 30:70 and 40:60. A PC constituted by Calibre 351-6 was used. The materials were kneaded in the extruder at a temperature of 300° C. with a screw speed of 200 revolutions per minute and then extruded into bars of 3 mm in diameter, which were cooled by water and then cut to a length of 4 mm to obtain pellets. The comparative sphere introduced to the second hopper was not preheated.

Comparative Example 7-2

The PC pellets and comparative sphere were blended and introduced simultaneously to the first hopper, where the blending ratio by weight of the comparative sphere and PC pellets was adjusted to one of the three levels of 20:80, 30:70 and 40:60. A PC constituted by Calibre 351-6 was used. The materials were kneaded in the extruder at a temperature of 300° C. with a screw speed of 200 revolutions per minute and then extruded into bars of 3 mm in diameter, which were cooled by water and then cut to a length of 4 mm to obtain pellets.

Table 16 shows the MFR, measured at 300° C., of the aforementioned pellets at each glass load ratio.

In the above, in Table 16 the MFR of Calibre 351-6 used in Example 7 was 10.0 when the thermoplastic resin load was 100 percent by weight.

TABLE 16

|  | 0% | 20% | 30% | 40% | 50% | 60% | 70% |
|---|---|---|---|---|---|---|---|
| PC | 10.0 | | | | | | |
| Example 7 | 10.0 | | | 7.3 | 5.5 | 3.4 | 1.5 |
| Comparative Example 7-1 | 10.0 | 7.1 | 5.5 | 3.0 | | | |
| Comparative Example 7-2 | 10.0 | 6.0 | 3.5 | 0.2 | | | |

FIG. 11 is a graph showing quadratic polynomial curves to approximate the relationships of glass load ratio and MFR, created based on the glass load ratio (percent by weight) and MFR data shown in Table 16.

In this graph, □ indicates the MFR for Example 7, Δ indicates the MFR for Comparative Example 7-1, and X indicates the MFR for Comparative Example 7-2. These MFR curves for Example 7 Comparative Example 7-1 and Comparative Example 7-2 show the trend of drop in each MFR when the load of glass powder was increased from 10.0 corresponding to the 100% MFR. Also to indicate the glass load ratio corresponding to 5.0 or one half the 100% MFR (10.0) of the PC (=1/2 MFR), a vertical line was drawn to the X-axis from the intersection of the line of 1/2 MFR and each curve.

Table 17 shows the glass load ratios corresponding to the aforementioned 1/2 MFR for Comparative Example 7-2, Comparative Example 7-1 and Example 7.

TABLE 17

| Comparative Example 7-2 (% by weight) | Comparative Example 7-1 (% by weight) | Example 7 (% by weight) |
|---|---|---|
| PC 24 | 32 | 53 |

In Example 7, an ice-making tray for refrigerator was able to be formed by injection molding using a glass-containing molding composition containing glass not only by 50 percent by weight, but also by 70 percent by weight.

Example 8

In Example 8, PLA was used as a thermoplastic resin, and the spherical E glass powder silanated by the atomization method was blended with the PLA at one of the four blending ratios by weight of 40:60, 50:50, 60:40, and 70:30.

A PLA constituted by Terramac TP-4030 (product name; manufactured by Unitika Ltd.) was weighed and 60 percent by weight of it was introduced from the first hopper of the aforementioned extruder, and after the resin was melted at 190° C., the spherical E glass powder specified above as the glass particle used in Examples was weighed and 40 percent by weight of it was preheated to a temperature equal or close to the resin melting temperature of 190° C. and introduced from the second hopper, after which the mixture was kneaded at a temperature of 190° C. with a screw speed of 200 revolutions per minute and then extruded into bars of 3 mm in diameter, which were cooled by water and then cut to a length of 4 mm to obtain pellets. This represents a Level 1 molding composition obtained in Example 8. The preheating temperature should most preferably be identical to the melting temperature of 190° C. (in a range of 190° C.±10%).

Similarly, a Level 2 molding composition was obtained from 50 percent by weight of Terramac TP-4030 and 50 percent by weight of spherical E glass powder, and a Level 3 molding composition was obtained from 30 percent by weight of Terramac TP-4030 and 70 percent by weight of spherical E glass powder.

Comparative Example 8-1

The PLA and comparative sphere were weighed and introduced separately into the extruder. Specifically, the PLA pellets were introduced to the first hopper, while the comparative sphere was introduced to the second hopper. The blending ratio by weight of the comparative sphere and PLA pellets was adjusted to one of the three levels of 20:80, 30:70 and 40:60. A PLA constituted by Terramac TP-4030 was used. The materials were kneaded in the extruder at a temperature of 190° C. with a screw speed of 200 revolutions per minute and then extruded into bars of 3 mm in diameter, which were cooled by water and then cut to a length of 4 mm to obtain pellets. The comparative sphere introduced to the second hopper was not preheated.

Comparative Example 8-2

The PLA pellets and comparative sphere were blended and introduced simultaneously to the first hopper, where the blending ratio by weight of the comparative sphere and PLA pellets was adjusted to one of the three levels of 20:80, 30:70 and 40:60. A PLA constituted by Terramac TP-4030 was used. The materials were kneaded in the extruder at a temperature of 190° C. with a screw speed of 200 revolutions per minute and then extruded into bars of 3 mm in diameter, which were cooled by water and then cut to a length of 4 mm to obtain pellets.

Table 18 shows the MFR, measured at 190° C., of the aforementioned pellets at each glass load ratio.

In the above, in Table 18 the MFR of Terramac TP-4030 used in Example 8 was 4.0 when the thermoplastic resin load was 100 percent by weight.

TABLE 18

|  | 0% | 20% | 30% | 40% | 50% | 60% | 70% |
|---|---|---|---|---|---|---|---|
| PLA | 4.0 | | | | | | |
| Example 8 | 4.0 | | | 2.9 | 2.3 | 1.7 | 1.0 |
| Comparative Example 8-1 | 4.0 | 3.1 | 2.3 | 1.3 | | | |
| Comparative Example 8-2 | 4.0 | 2.7 | 1.5 | 0.3 | | | |

FIG. 12 is a graph showing quadratic polynomial curves to approximate the relationships of glass load ratio and MFR, created based on the glass load ratio (percent by weight) and MFR data shown in Table 18.

In this graph, □ indicates the MFR for Example 8, Δ indicates the MFR for Comparative Example 8-1, and X indicates the MFR for Comparative Example 8-2. These MFR curves for Example 8 Comparative Example 8-1 and Comparative Example 8-2 show the trend of drop in each MFR when the load of glass powder was increased from 4.0 corresponding to the 100% MFR. Also to indicate the glass load ratio corresponding to 2.0 or one half the 100% MFR (4.0) of the PLA (=1/2 MFR), a vertical line was drawn to the X-axis from the intersection of the line of 1/2 MFR and each curve.

Table 19 shows the glass load ratios corresponding to the aforementioned 1/2 MFR for Comparative Example 8-2, Comparative Example 8-1 and Example 8.

TABLE 19

|  | Comparative Example 8-2 (% by weight) | Comparative Example 8-1 (% by weight) | Example 8 (% by weight) |
| --- | --- | --- | --- |
| PLA | 26 | 32 | 56 |

In Example 8, the handle of a cosmetic brush was able to be formed by extrusion molding using a glass-containing molding composition containing glass not only by 50 percent by weight, but also by 70 percent by weight.

Example 9

In Example 9, Ny was used as a thermoplastic resin, and the spherical E glass powder silanated by the atomization method was blended with the Ny at one of the four blending ratios by weight of 40:60, 50:50, 60:40, and 70:30.

A Ny constituted by Nylon A1030 BRF (product name; manufactured by Unitika Ltd.) was weighed and 60 percent by weight of it was introduced from the first hopper of the aforementioned extruder, and after the resin was melted at 230° C., the spherical E glass powder specified above as the glass particle used in Examples was weighed and 40 percent by weight of it was preheated to a temperature equal or close to the resin melting temperature of 230° C. and introduced from the second hopper, after which the mixture was kneaded at a temperature of 230° C. with a screw speed of 200 revolutions per minute and then extruded into bars of 3 mm in diameter, which were cooled by water and then cut to a length of 4 mm to obtain pellets. This represents a Level 1 molding composition obtained in Example 9. The preheating temperature should most preferably be identical to the melting temperature of 230° C. (in a range of 230° C.±10%).

Similarly, a Level 2 molding composition was obtained from 50 percent by weight of Nylon A1030 BRF and 50 percent by weight of spherical E glass powder, and a Level 3 molding composition was obtained from 30 percent by weight of Nylon A1030 BRF and 70 percent by weight of spherical E glass powder.

Comparative Example 9-1

The Ny and comparative sphere were weighed and introduced separately into the extruder. Specifically, the Ny pellets were introduced to the first hopper, while the comparative sphere was introduced to the second hopper. The blending ratio by weight of the comparative sphere and Ny pellets was adjusted to one of the three levels of 20:80, 30:70 and 40:60. A Ny constituted by Nylon A1030 BRF was used. The materials were kneaded in the extruder at a temperature of 230° C. with a screw speed of 200 revolutions per minute and then extruded into bars of 3 mm in diameter, which were cooled by water and then cut to a length of 4 mm to obtain pellets. The comparative sphere introduced to the second hopper was not preheated.

Comparative Example 9-2

The Ny pellets and comparative sphere were blended and introduced simultaneously to the first hopper, where the blending ratio by weight of the comparative sphere and Ny pellets was adjusted to one of the three levels of 20:80, 30:70 and 40:60. A Ny constituted by Nylon A1030 BRF was used. The materials were kneaded in the extruder at a temperature of 230° C. with a screw speed of 200 revolutions per minute and then extruded into bars of 3 mm in diameter, which were cooled by water and then cut to a length of 4 mm to obtain pellets.

Table 20 shows the MFR, measured at 230° C., of the aforementioned pellets at each glass load ratio.

In the above, in Table 20 the MFR of Nylon A1030 BRF used in Example 9 was 4.3 when the thermoplastic resin load was 100 percent by weight.

TABLE 20

|  | 0% | 20% | 30% | 40% | 50% | 60% | 70% |
| --- | --- | --- | --- | --- | --- | --- | --- |
| Ny | 4.3 |  |  |  |  |  |  |
| Example 9 | 4.3 |  |  | 3.1 | 2.4 | 1.6 | 0.8 |
| Comparative Example 9-1 | 4.3 | 3.2 | 2.4 | 1.0 |  |  |  |
| Comparative Example 9-2 | 4.3 | 2.7 | 1.4 | 0.3 |  |  |  |

As explained above, molding compositions containing spherical glass powder by a glass load ratio of 40 to 70 percent by weight was able to be obtained from various types of resins. The methods for forming a molded product using any of these molding compositions include the blow molding method, injection molding method, extrusion molding method, vacuum molding method and press molding method, among others.

FIG. 13 is a graph showing quadratic polynomial curves to approximate the relationships of glass load ratio and MFR, created based on the glass load ratio (percent by weight) and MFR data shown in Table 20.

In this graph, □ indicates the MFR for Example 9, Δ indicates the MFR for Comparative Example 9-1, and X indicates the MFR for Comparative Example 9-2. These MFR curves for Example 9 Comparative Example 9-1 and Comparative Example 9-2 show the trend of drop in each MFR when the load of glass powder was increased from 4.3 corresponding to the 100% MFR. Also to indicate the glass load ratio corresponding to 2.2 or one half the 100% MFR (4.3) of the Ny (=1/2 MFR), a vertical line was drawn to the X-axis from the intersection of the line of 1/2 MFR and each curve.

Table 21 shows the glass load ratios corresponding to the aforementioned 1/2 MFR for Comparative Example 9-2, Comparative Example 9-1 and Example 9.

TABLE 21

|  | Comparative Example 9-2 (% by weight) | Comparative Example 9-1 (% by weight) | Example 9 (% by weight) |
| --- | --- | --- | --- |
| Ny | 24 | 32 | 53 |

In Example 9, a brush material was able to be molded by spinning 100-dtex monofilaments using a glass-containing molding composition containing glass not only by 50 percent by weight, but also by 70 percent by weight.

With regard to Comparative Example 1, Comparative Examples 1-1 through 9-1 that used comparative spheres at glass load ratio of 20 and 30 percent by weight were conducted by kneading and extruding with an extruder at the most suitable temperature according to each resin and caused no changes such as increase in temperature, while changes of temperature increase were observed in Comparative Example 1-1 through Comparative Example 9-1 that use comparative spheres at a glass load ratio of 40 percent by weight. For example, increase by a range of 10 to 50° C. was observed with PE.

With regard to Comparative Example 2, Comparative Example 1-2 through Comparative Example 9-2 that used comparative spheres at glass load ratio 20 percent by weight caused no changes such as increase in temperature, while changes of temperature increase along with generation of metal sound were observed in Comparative Examples 1-2 through 9-2 that used comparative spheres at a glass load ratio of 30 and 40 percent by weight. Particularly, metal sound of comparative sphere at 40 percent by weight was much louder than that of 30 percent by weight.

In view of this, it is understood that the comparative spheres of Comparative Examples 1 and 2 undergo changes when MFR of the comparative spheres becomes 1/2 or less of 100% resin from FIG. 5 through FIG. 13.

However, neither changes in temperature nor generation of metal sound was observed in Examples 1 through 9 that used spherical glass powder at a glass load ratio of 60 and 70 percent by weight despite their MFRs being 1/2 or less of 100% resin. These differences between Examples and Comparative Examples when MFRs are 1/2 or less demonstrate that Examples completely eliminated the aforementioned four factors, (1) sudden drop in flowability in a semi-molten state, (2) presence of aggregated glass powder particles, (3) glass powder having varying shapes and their average particle size, and (4) difference of specific heat between glass and thermoplastic resin.

Therefore, this indicates that the four factors were eliminated and molding of a glass containing molding composition including glass powder at glass load ratio in a range of 40 to 70 percent by weight became possible by: introducing glass powder at glass load ratio in a range of 40 to 70 percent by weight through a second hopper provided in a position where thermoplastic resin becomes molten state in order to address the first factor of semi-molten state occurrence where solids and liquid are mixed; covering surface of the individual glass powder entirely with a silane compound using atomization method in order to address the second factor of presence of aggregated glass powder particles; introducing glass powder having spherical shape and narrower particle size distribution with average particle size of 10 to 40 μm in order to address the third factor of varying shapes and wide distribution of glass powder particle; and introducing preheated glass powder in a range of glass load ratio of 40 to 70 percent by weight to a region where the aforementioned thermoplastic resin is in a molten state in order to address the fourth factor of having large specific heat difference.

It was also found out that the glass powder in each of the aforementioned glass-containing molding compositions that were formed was constituted by particles that have a spherical shape and an average particle size of 10 to 40 μm, are coated by a silane compound over their entire surface, and are independently and uniformly dispersed in the thermoplastic resin as a glass load ratio in a range of 40 to 70 percent by weight Furthermore, judging from the production methods of the aforementioned nine types of compositions described in respective Examples, a glass-containing molding composition constituted by a thermoplastic resin containing glass powder by a glass load ratio in a range of 40 to 70 percent by weight can be formed by spraying the crushed material of the glass fibers into high-temperature flames to produce spherical glass powder particles, obtaining the spherical glass powder which is covered with silane compound by injecting the water containing a silane compound, introducing a weighed amount of thermoplastic resin into the aforementioned extruder to melt it, preheating a weighed amount of the aforementioned spherical glass powder as a glass load ratio is in a range of 40 to 70 percent by weight, and then introducing and kneading the preheated spherical glass powder into the aforementioned extruder to the region where the thermoplastic resin is in a molten state.

It should be noted that, while the above Examples presented variations of the best mode for carrying out the present invention where the spherical glass powder to be introduced to the extruder was preheated to a temperature equal or close to the melting temperature of the resin, the present invention is not at all limited to these Examples, and a glass-containing molding composition produced at any melting temperature heating/cooling), screw speed or other condition traditionally used to form pellets is also considered as a glass-containing molding composition conforming to the present invention.

Next, the MFR that indicate the characteristics of the nine types of compositions obtained in the Examples is explained.

The graphs in FIGS. 5 to 13 show the relationship of glass load ratio and MFR for each of the nine types of Examples providing compositions containing the spherical E glass powder, as well as Comparative Examples providing compositions containing the comparative sphere. When these graphs are compared, in the case of Examples the aforementioned MFR draws a parabola as the glass load ratio increases having a peak at the MFR of 100% thermoplastic resin and 1/2 values of 100% MFR are in a range of glass load ratio of 50 to 60 percent by weight while the graphs for Comparative Examples 1 and 2 of the nine types show that the aforementioned MFR draws an almost straight line peaking at the MFR of 100% thermoplastic resin and declining as the glass load ratio percent by weight increases and 1/2 values of the MFR at 100% thermoplastic resin for Comparative Example 1 and Comparative Example 2 are in a range of glass load ratio of 30 to 40 percent by weight and in a range of glass load ratio of 20 to 30 percent by weight, respectively.

Therefore, Examples of the nine types show that the aforementioned MFR draws a parabola as the glass load ratio increases having a peak at the MFR of 100% thermoplastic resin, where MFR is 1/2 or more of 100% MFR when the glass load ratio is in a range of 40 to 50 percent by weight and changes from 1/2 of 100% MFR to 1/2 or less of 100% MFR when the glass load ratio is in a range of 50 to 60 percent by weight.

Comparative Example 1 shows that the aforementioned MFR draws an almost straight line peaking at the MFR of 100% thermoplastic resin and declining as the glass load ratio percent by weight increases where transition from 1/2 or more of 100% MFR to 1/2 or less of 100% MFR occurs when the glass load ratio is in a range of 30 to 40 percent by weight. Comparative Example 2 shows that the aforementioned MFR draws an almost straight line peaking at the MFR of 100% thermoplastic resin and declining as the glass load ratio percent by weight increases where transition from 1/2 or more of 100% MFR to 1/2 or less of 100% MFR occurs when the glass load ratio is in a range of 20 to 30 percent by weight.

The graphs of Examples 1 through 9 exhibit that a decline in MFR as the glass load ratio increases is more gradual in comparison to the graphs of Comparative Examples, thereby it is understood that changes in MFR would be small even if an introducing amount of spherical glass powder changes in manufacturing process. Therefore, the graphs indicate that it is advantageous to quality control in manufacturing process of glass containing molding compositions.

Next, glass load ratios of Comparative Example 2, Comparative Example 1, and Example at 1/2 MFR for each thermoplastic resin used in the above Examples 1 through 9 are summarized for all nine thermoplastic resin types in Table 22.

In view of the MFRs of Comparative Examples and Examples shown in Table 22, the glass load ratio of Comparative Example 2 at 1/2 MFR is in a range of 24 to 28 percent by weight, the glass load ratio of Comparative Example 1 at 1/2 MFR is in a range of 31 to 36 percent by weight, and the glass load ratio of Example at 1/2 MFR is in a range of 53 to 57 percent by weight, thereby it is discovered that while Comparative Example 2 exhibits extremely low glass load ratio in a range of 24 to 28 percent by weight when the aforementioned MFR is 1/2 value and Comparative Example 1 exhibits slightly higher than Comparative Example 2 under the same conditions which is glass load ratio in a range of 31 to 36 percent by weight, Examples 1 through 9 exhibit high glass load ratio in a range of 53 to 57 percent by weight under the same conditions which is about twice as high as Comparative Example 2 and about 1.6 times as high as Comparative Example 1.

1/2 MFR of the aforementioned thermoplastic resin is useful for understanding characteristic of MFR of glass containing molding composition as a glass load ratio increases.

TABLE 22

|       | Comparative Example 2 | Comparative Example 1 | Example |
|-------|-----------------------|-----------------------|---------|
| HD-PE | 26                    | 36                    | 57      |
| PP    | 26                    | 32                    | 54      |
| PET   | 25                    | 32                    | 57      |
| PS    | 26                    | 32                    | 53      |
| ABS   | 28                    | 33                    | 54      |
| PVC   | 25                    | 31                    | 53      |
| PC    | 24                    | 32                    | 53      |
| PLA   | 26                    | 32                    | 56      |
| Ny    | 24                    | 32                    | 53      |

Table 23 shows five points in Examples 1 through 9, MFRs of 100% thermoplastic resin, glass load ratio of 40, 50, 60, and 70 percent by weight. FIG. 14 is a graph which exhibits the relationship of glass load ratio and MFR in the glass containing molding compositions of Examples 1 through 9 where approximate curves of quadratic polynomial expressions calculated based on the five-point data in Table 23 are shown. The graph shows a trend that MFR of 100% thermoplastic resin gradually declines as glass load ratio increases, where ABS and PET which have high MFRs of 30.0 and 20.0 respectively show a trend that declines more significantly drawing a parabola in comparison with other resins while PC and PP which have MFR of 10.0 show a trend that declines gradually drawing a parabola. PS, Ny, PLA, PVC, and PE which have MFRs in a range of 0.25 to 7.5 show a trend that declines even more gradually than PC and PP in view of FIGS. 5, 6, 8, 10, 11, 12, and 13.

TABLE 23

|                  | 0%   | 40%  | 50%  | 60%  | 70%  |
|------------------|------|------|------|------|------|
| Example 1 (PE)   | 0.25 | 0.18 | 0.15 | 0.12 | 0.07 |
| Example 2 (PP)   | 10.0 | 7.0  | 5.6  | 4.0  | 2.0  |
| Example 3 (PET)  | 20.0 | 15.0 | 12.3 | 8.0  | 5.0  |
| Example 4 (PS)   | 7.5  | 4.9  | 3.9  | 2.8  | 2.0  |
| Example 5 (ABS)  | 30.0 | 22.0 | 16.7 | 12.4 | 3.4  |

TABLE 23-continued

|                  | 0%   | 40%  | 50%  | 60%  | 70%  |
|------------------|------|------|------|------|------|
| Example 6 (PVC)  | 3.4  | 2.5  | 1.9  | 1.2  | 0.6  |
| Example 7 (PC)   | 10.0 | 7.3  | 5.5  | 3.4  | 1.5  |
| Example 8 (PLA)  | 4.0  | 2.9  | 2.3  | 1.7  | 1.0  |
| Example 9 (Ny)   | 4.3  | 3.1  | 2.4  | 1.6  | 0.8  |

Examples 1 through 9 show that a declining MFR draws a parabola as glass load ratio increases. If a reduction ratio of MFR can be calculated as a quantitative value indicating the reduction to what degree against the MFR of 100% thermoplastic as glass load ratio increases to 40, 50, 60, and 70 percent by weight, for example if a reduction ratio of glass containing molding composition with glass load ratio of 70 percent by weight can be calculated, it is known in advance that a reduction ratio of MFR to what degree can prevent troubles such as a screw being damaged when an extruder runs for many hours.

Also, although the larger quantities of spherical glass powder are added, the more effective to solve global warming and depletion of limited petroleum resource issue, the glass load ratio that makes molding easy in any molding methods needs to be investigated by calculating a reduction ratio of MFR considering the event that molded bodies formed by blow molding, injection molding, extrusion molding and others using a glass containing molding composition are produced in a large scale.

If the interrelationship of glass load ratio and reduction ratio of MFR is known, it becomes possible to easily determine a glass load ratio according to MFR of the selected thermoplastic resin. For example, in the case that HD-PE is selected and mold a glass containing molding composition, it will be convenient because the melt flow rate of 100% HD-PE is a small value of 0.25 if the required glass load ratio is easily determined for molding with a controlled reduction ratio of 0.6.

First, how to calculate a reduction ratio of MFR corresponding to an increase of glass load ratio in thermoplastic resin is explained.

As described above, glass load ratios of Comparative Example 2, Comparative Example 1, and Example at 1/2 MFR for each thermoplastic resin in the above Examples 1 through 9 are shown in Table 22, where the 1/2 MFR of thermoplastic resin indicates the glass load ratio where MFR of the glass containing molding composition becomes 1/2 value of 100% thermoplastic as spherical glass introduced to the 100% thermoplastic resin increases. For example, PE and PP show 1/2 values of 100% thermoplastic resin at 57 percent by weight and 54 percent by weight, respectively. From this, a value of the MFR of glass load ratio at 40, 50, 60, 70 percent by weight from Examples 1 through 9 shown in Table 23 divided by the MFR of 100% thermoplastic resin indicates a reduction ratio of MFR, in other words, the value indicates that the MFR of 100% thermoplastic resin declined to what degree as the glass load ratio increases.

The value of the MFR of glass load ratio at 40, 50, 60, 70 percent by weight from Examples 1 through 9 shown in Table 23 divided by the MFR of 100% thermoplastic resin is defined as "melt flow rate reduction ratio" (hereinafter referred to as "MFR reduction ratio" or "relative MFR") and the values were calculated. The values calculated are shown in Table 24. Please note that Table 24 shows MFR reduction ratios when glass load ratio is at 40, 50, 60, and 70 percent by weight and each glass load ratio having a range different from others, while Table 22 shows the glass load ratio values at 1/2 MFR.

TABLE 24

|  | 0% | 40% | 50% | 60% | 70% |
|---|---|---|---|---|---|
| Example 1 (PE) | 1 | 0.72 | 0.60 | 0.48 | 0.28 |
| Example 2 (PP) | 1 | 0.70 | 0.56 | 0.40 | 0.20 |
| Example 3 (PET) | 1 | 0.75 | 0.62 | 0.40 | 0.25 |
| Example 4 (PS) | 1 | 0.65 | 0.52 | 0.37 | 0.27 |
| Example 5 (ABS) | 1 | 0.73 | 0.56 | 0.41 | 0.11 |
| Example 6 (PVC) | 1 | 0.74 | 0.56 | 0.35 | 0.18 |
| Example 7 (PC) | 1 | 0.73 | 0.55 | 0.34 | 0.15 |
| Example 8 (PLA) | 1 | 0.73 | 0.56 | 0.43 | 0.25 |
| Example 9 (Ny) | 1 | 0.72 | 0.56 | 0.37 | 0.19 |

FIG. 15 is a graph showing the relationship of MFR reduction ratio (relative MFR) of glass containing molding composition and glass load ratio from Examples 1 through 9 which shows approximate curves of quadratic polynomial expressions (i.e. parabolas) of MFR reduction ratio from nine types in Examples 1 through 9 calculated based on the five-point data in Table 24. For example, ABS is expressed as $y=-1.9686x^2+0.136x+0.9982$, PP is expressed as $y=-1.31x^2-0.2218x+0.9997$, PS is expressed as $y=-0.5147x^2-0.7046x+1.017$, and these formulas exhibit parabolas. In the graph of FIG. 15, the x-axis shows glass load ratio (percent by weight) and the y-axis shows MFR reduction ratio. Examples 1 through 9 of the nine types have MFRs of their own values (0.25-30.0) at 100% but, in all cases of Examples 1 through 9, it is shown that MFR reduction ratio gradually declines as glass load ratio increases and the MFR reduction ratios of the nine types corresponding to the each glass load ratio are populated in a narrow range of 0.10-0.17 without spread. With specific examples, differences of maximum and minimum values of the MFR reduction ratios for each glass load ratio are: the maximum value of 0.75 and the minimum value of 0.65 at glass load ratio 40 percent by weight showing difference of 0.10, the maximum value of 0.62 and the minimum value of 0.52 at glass load ratio 50 percent by weight showing difference of 0.10, the maximum value of 0.48 and the minimum value of 0.34 at glass load ratio 60 percent by weight showing difference of 0.14, and the maximum value of 0.28 and the minimum value of 0.11 at glass load ratio 70 percent by weight showing a populated range of 0.17.

From the fact that the difference between maximum and minimum values of MFR reduction ratios are in the aforementioned narrow range, it is indicated that MFR reduction ratio gradually declines in a similar manner as glass load ratio increases regardless of thermoplastic type, for example regardless of modulus of elasticity due to different melting point and glass transition temperature of crystal macromolecules such as HD-PE, PP, PET and non-crystal macromolecules of PS and PVC.

Table 25 shows maximum value and minimum value of MFR reduction ratio corresponding to glass load ratio at 40 percent by weight, 50 percent by weight, 60 percent by weight, and 70 percent by weight in Table 24.

TABLE 25

|  | 0% | 40% | 50% | 60% | 70% |
|---|---|---|---|---|---|
| Maximum value | 1.00 | 0.75 | 0.62 | 0.48 | 0.28 |
| Minimum value | 1.00 | 0.65 | 0.52 | 0.34 | 0.11 |

Next, to what degree of MFR reduction ratio can prevent troubles such as a screw being damaged and to what degree of MFR reduction ratio makes molding easy to obtain molded products in any molding methods as discussed above will be explained.

Table 24 shows that MFR reduction ratios of glass load ratio at 40 percent by weight are in a range of 0.65 to 0.75. Since the maximum value at glass load ratio 40 percent by weight of 0.75 in Example 3 is 3/4, MFR reduction ratio of glass load ratio 40 percent by weight is maximum at 3/4 in Example 3 and minimum at 0.65 in Example 4. Also, MFR reduction ratio of glass load ratio 50 percent by weight is in a range of 0.52 to 0.62 and MFR reduction ratio of glass load ratio 60 percent by weight is in a range of 0.34 to 0.48. Since the aforementioned 1/2 MFR means that MFR reduction ratio is 1/2 and glass load ratio is in a range of 53 to 57 percent by weight as described above, Examples of glass load ratio 53 percent by weight having the minimum value within the range are Example 4 (PS), Example 6 (PVC), Example 7 (PC), and Example 9 (Ny) while the other Examples of Example 1 (PE), Example 2 (PP), Example 3 (PET), Example 5 (ABS), and Example 8 (PLA) have MFR reduction ratio larger than 1/2 with glass load ratio 53 percent by weight, in view of Table 22.

In view of the above, it can be stated that gradually declining MFR as glass load ratio increases has an MFR reduction ratio in a range of 3/4 to more than 1/2 when glass load ratio is in a range of 40 to 52 percent by weight. Here, please note that "more than 1/2" does not include 1/2.

As described above, Examples 1 through 9 show MFR reduction ratio 1/2 when glass load ratio is in a range of 53 to 57 percent by weight, where Example 4 (PS), Example 6 (PVC), Example 7 (PC), and Example 9 (Ny) show MFR reduction ratio of 1/2 when glass load ratio is 53 percent by weight while other five Examples are: MFR reduction ratio is 1/2 with glass load ratio 57 percent by weight in Example 1 (PE) and Example 3 (PET), MFR reduction ratio is 1/2 with glass load ratio 56 percent by weight in Example 8 (PLA), and MFR reduction ratio is 1/2 with glass load ratio 54 percent by weight in Example 2 (PP) and Example 5 (ABS). Therefore, when the aforementioned glass load ratio is in a range of 53 to 57 percent by weight, Example 4, Example 6, Example 7, and Example 9 show MFR of 1/2 or less, Example 2, Example 5, and Example 8 show MFR of more than 1/2 to 1/2 or less, and Example 1 and Example 3 show MFR of 1/2 or more. Therefore, it can be stated that when glass load ratio is in a range of 53 to 57 percent by weight Examples 1 through 9 show at least two categories including 1/2 among three categories of more than 1/2, 1/2, and less than 1/2.

Now, considering that the compositions in Examples 1 through 9 are molded by blow molding, injection molding, extrusion molding and others to mass-produce molded bodies, it is better having a smaller ratio of the MFR reduced. However, considering global warming and depletion of limited petroleum resource issues, it is better having a higher glass load ratio. Thinking of balancing these two, MFR reduction ratio of 1/2 is an optimal value to keep the balance of these two since the glass load ratio is in a range of 53-57 percent by weight as in Examples 1 through 9.

The glass load ratio that renders MFR reduction ratio 1/4 (i.e. an half of MFR reduction ratio 1/2) corresponds to glass load ratio 70 percent by weight in Example 3 (PET) and Example 8 (PLA) and it is apparent that the other Examples render MFR reduction ratio of 1/4 or more when glass load ratio is at 64 percent by weight because Example 5 (ABS) shows the smallest value of MFR reduction ratio at glass load ratio 70 percent by weight among the Examples and shows MFR reduction ratio of 1/4 when glass load ratio is 64 percent by weight. Further, as already described, Examples 1 through 9 show 1/2 value with glass load ratio in a range of 53 to 57 percent by weight. For that reason, it can be stated that MFR reduction ratio is in a range of less than 1/2 to 1/4 when the aforementioned glass load ratio is in a range of 58 to 64 percent by weight. Example 3 (PET) and Example 8 (PLA) show MFR reduction ratio of 1/4 when glass load ratio is at 70 percent by weight, where MFR of Example 3 and Example 5 gradually declines drawing a parabola, tends to decline more significantly in comparison with the other resins, and declines dramatically when glass load ratio becomes 70 percent by weight or above as shown in FIG. 14. Thus, it is important that a glass containing molding composition with the aforementioned MFR reduction ratio in a range of 1/4 or above is used. There is a chance that it might cause a problem when a glass containing molding composition having MFR reduction ratio of 1/4 or less is molded as well as when molded bodies are formed using the composition. Therefore, a problem such as a screw being damaged when commercially mass-produced for many hours can be prevented and no problem when molded bodies are formed with the composition is ensured by using a glass containing molding composition with an MFR reduction ratio in a range of 1/4 or more.

From the above described, it is discovered that a glass containing molding composition of the present invention has an MFR reduction ratio 3/4 or less of the aforementioned 100% thermoplastic resin with glass load ratio 40 percent by weight, an MFR reduction ratio of 1/4 or more with glass load ratio 64 percent by weight, an MFR reduction ratio of 3/4 to more than 1/2 with glass load ratio in a range of 40 to 52 percent by weight, an MFR reduction ratio of 1/2 with glass load ratio in a range of 53 to 57 percent by weight, and an MFR reduction ratio in a range of less than 1/2 to 1/4 with glass load ratio in a range of 58 to 64 percent by weight.

From the above, it is discovered that MFR reduction ratios of 3/4, 1/2 (2/4), and 1/4 correspond to glass load ratio of 100% thermoplastic resin at 40 percent by weight, 53 to 57 percent by weight, and 64 percent by weight, respectively, and that these glass load ratios are technologically meaningful values.

In other words, although it is possible to form a glass containing molding composition of the present invention with a glass load ratio in a range of 40 to 70 percent by weight, it is preferred to mold with a glass load ratio within 64 percent by weight corresponding to MFR reduction ratio of 1/4 or more considering preventing troubles such as a screw being damaged and others, and it is more preferable to mold with glass load ratio in a range of 53 to 57 percent by weight corresponding to MFR reduction ratio of 1/2 (2/4) considering the glass containing molding composition and molded bodies being mass-produced therefrom as well as reducing global warming and depletion of limited petroleum resource issue.

FIG. 16 is a graph of approximate curves of quadratic polynomial expressions obtained from the maximum and minimum values of MFR reduction ratios (relative MFR's) corresponding to each glass load ratio shown in Table 25 where the maximum values and the minimum values are approximated with two quadratic polynomial expressions for the relationship of MFR reduction ratio and glass load ratio in the glass containing molding compositions of Examples 1-9. In this graph, ○ indicates maximum value of MFR reduction ratio and X indicates minimum value of MFR reduction ratio.

The approximate curve for the maximum values is shown in Formula (1) below and the approximate curve for the minimum values is shown in Formula (2) below. Here, x represents glass load ratio ($0.4 \leq x \leq 0.7$) and y represents MFR reduction ratio (relative MFR).

$$y = -1.3418x^2 - 0.0803x + 0.9994 \quad (1)$$

$$y = -1.4003x^2 - 0.2764x + 0.9985 \quad (2)$$

Formulas (1) and (2) show parabolas obtained from the maximum values and the minimum values of MFR reduction ratios corresponding to each glass load ratio introduced to 100% thermoplastic resin, which indicate that an MFR reduction ratio corresponding to any of the glass load ratios in a range of 40 to 70 percent by weight is within the range described in Formulas (1) and (2).

Since the above formulas show interrelationship of glass load ratio and MFR reduction ratio, it became possible to easily determine a glass load ratio according to melt flow rate of the selected thermoplastic resin. If interrelationship of glass load ratio and MFR reduction ratio was unknown and an MFR reduction ratio of 0.6 is required when spherical glass powder is introduced to a selected thermoplastic resin of HD-PE which has small melt flow rate of 0.25, for example, spherical glass powder would have to be introduced by trial and error and then the MFR needs to be measured since how much of glass load ratio should be introduced was unknown. However, since the maximum value of 52 percent by weight and the minimum value of 45 percent by weight are calculated using the above formulas with MFR reduction ratio of 0.6, an appropriate glass load ratio can now be determined according to use of the selected composition and others.

As already described, because MFR reduction ratio gradually declines in a similar manner as glass load ratio increases regardless of thermoplastic type and regardless of modulus of elasticity due to different melting point and glass transition temperature of crystalline polymer such as HD-PE, PP, PET and non-crystalline polymer of PS and PVC, for example, flow properties of glass containing molding compositions can now be systematically understood. Therefore, if MFR reduction ratio is selected, a glass load ratio of spherical glass powder to be introduced to a resin can be estimated and improving a glass containing molding composition as well as operation of forming glass containing molded bodies became possible.

For example, in order to obtain a glass containing molding composition having MFR reduction ratio of 1/2, spherical glass powder at glass load ratio of 53 to 57 percent by weight should be introduced to 100% thermoplastic resin, which improves the glass containing molding composition as well as operation of forming glass containing molded bodies, and can also reduce global warming and depletion of limited petroleum resource issue. In order to obtain a glass containing molding composition having MFR reduction ratio of 1/4 or more, spherical glass powder at glass load ratio of up to 64 percent by weight should be introduced to 100% thermoplastic resin, which can prevent troubles such as a screw being damaged.

What is claimed is:

1. A pellet for glass-containing molding produced by kneading a glass powder and a thermoplastic resin and then extruding the kneaded mixture using an extruder which comprises;

first hopper where the pellet of the thermoplastic resin is introduced and second hopper where the glass powder is introduced which is provided in the position where the thermoplastic resin becomes molten state, wherein the thermoplastic resin is selected from the group consisting of polyethylene resins, polypropylene resins, polyester resins, polystyrene resins, ABS resins, polyvinyl chloride, polyamide resins, polycarbonate resins, and polylactic acid resins;

the glass powder is constituted by particles that are solid and have a spherical shape and an average particle diameter of 10 to 40 μm, is coated by a silane compound over their entire surface using atomization method, is incorporated in the thermoplastic resin at a glass load of 40 to 70 percent by weight; and a reduction ratio of melt flow rate of the pellet for glass-containing molding shows the value in a range of 0.75 to 0.11, wherein the reduction ratio of melt flow rate shows a value falling within the range defined by equations (1) and (2) below with an increase of the glass load:

$$y=-1.3418x2-0.0803x+0.9994 \quad (1)$$

$$y=-1.4003x2-0.2764x+0.9985 \quad (2)$$

x: Glass load ($0.40 \leqq x \leqq 0.64$)
y: Reduction ratio of melt flow rate.

2. The pellet for glass-containing molding according to claim 1, characterized in that the glass powder is contained as a glass load in a range of 40 to 64 percent by weight, and the reduction ratio of melt flow rate shows a value of 3/4 to 1/4.

3. The pellet for glass-containing molding according to claim 1, characterized in that the reduction ratio of melt flow rate shows a value of 1/2 within a glass load of 53 to 57 percent by weight.

4. The pellet for glass-containing molding according to claim 1, characterized in that the reduction ratio of melt flow rate shows a value in a range of 3/4 to more than 1/2 within a glass load of 40 to 52 percent by weight, and in a range of less than 1/2 to 1/4 within a glass load of 58 to 64 percent by weight.

5. The pellet for glass-containing molding according to claim 1, characterized in the pellet is used as a pellet of molding composition for blow molding, injection molding, extrusion molding, vacuum molding, or press molding.

6. A pellet for glass-containing molding produced by kneading a glass powder and a thermoplastic resin and then extruding the kneaded mixture using an extruder which comprises;

first hopper where the pellet of the thermoplastic resin is introduced and second hopper where the glass powder is introduced which is provided in the position where the thermoplastic resin becomes molten state, wherein the thermoplastic resin is selected from the group consisting of polyethylene resins, polypropylene resins, polyester resins, polystyrene resins, ABS resins, polyvinyl chloride, polyamide resins, polycarbonate resins, and polylactic acid resins;

the glass powder is constituted by particles that are solid and have a spherical shape and an average particle diameter of 10 to 40 μm, are coated by a silane compound over their entire surface using atomization method, and the solid spherical glass powder is incorporated in the thermoplastic resin at a glass load of 40 to 70 percent by weight and is independently dispersed in a continuous phase of the thermoplastic resin.

7. The pellet for glass-containing molding according to claim 6, characterized in the pellet is used as a pellet of molding composition for blow molding, injection molding, extrusion molding, vacuum molding, or press molding.

8. A method for producing a pellet for glass-containing molding of claim 6, comprising:

obtaining a spherical glass powder covered by a silane compound by spraying an atomized product of glass fiber into high-temperature flame, thereby forming spherical shapes, and spraying silane compound-containing water thereon;

introducing a weighed amount of pellets into the extruder and melting the thermoplastic resin;

weighting the spherical glass powder in a range of a glass load of 40 to 70 percent by weight; and obtaining a pellet by introducing the weighted spherical glass powder inside the extruder in a region where the pellets are is in a molten state, and then kneading the mixture.

9. The method for producing a pellet for glass-containing molding according to claim 8, characterized in that the water contains the silane compound in an amount of 0.1 percent by weight.

\* \* \* \* \*

UNITED STATES PATENT AND TRADEMARK OFFICE
CERTIFICATE OF CORRECTION

| | | |
|---|---|---|
| PATENT NO. | : 8,007,907 B2 | |
| APPLICATION NO. | : 12/681594 | |
| DATED | : August 30, 2011 | |
| INVENTOR(S) | : Kenji Nakamura | |

It is certified that error appears in the above-identified patent and that said Letters Patent is hereby corrected as shown below:

At Page 1 (Item 56) Column 2, line 16, Under Other Publications, please change "patial" to --partial--.

At Column 3, line 9-15, please delete "The aforementioned ........ into the resin." and insert the same on line 8, Col. 3, after "compound." as a continuation of the Paragraph.

At Column 7, line 15, please change "100" to --100μm.--.

At Column 8, line 63, please change "weight" to --weight,--.

At Column 8, line 63, please change "load" to --load ratio--.

At Column 9, line 44, please change "value" to --value in a range--.

At Column 12, line 30, please change "extruder" to --extruder.--.

At Column 17, line 12, please change "half" to --half.--.

At Column 19, line 15, please change "For your information," to --In the above,--.

At Column 25, line 61, please change "10%)" to --10%).--.

At Column 35, line 62, please change "weight" to --weight.--.

At Column 44, line 33, in Claim 8, please change "are is" to --are--.

Signed and Sealed this
Twentieth Day of March, 2012

David J. Kappos
*Director of the United States Patent and Trademark Office*